(12) United States Patent
Mansmann

(10) Patent No.: US 12,521,248 B2
(45) Date of Patent: *Jan. 13, 2026

(54) MEDICAL IMPLANT AND ANCHORING SYSTEM FOR A MEDICAL IMPLANT

(71) Applicant: FORMAE, INC., Paoli (PA)

(72) Inventor: Kevin A. Mansmann, Paoli (PA)

(73) Assignee: FORMAE, INC., Paoli, PA (US)

( * ) Notice: Subject to any disclaimer, the term of this patent is extended or adjusted under 35 U.S.C. 154(b) by 236 days.

This patent is subject to a terminal disclaimer.

(21) Appl. No.: 15/766,066

(22) PCT Filed: Oct. 5, 2016

(86) PCT No.: PCT/US2016/055403
§ 371 (c)(1),
(2) Date: Apr. 5, 2018

(87) PCT Pub. No.: WO2017/062397
PCT Pub. Date: Apr. 13, 2017

(65) Prior Publication Data
US 2018/0289493 A1    Oct. 11, 2018

Related U.S. Application Data

(60) Provisional application No. 62/237,477, filed on Oct. 5, 2015, provisional application No. 62/237,471, filed on Oct. 5, 2015.

(51) Int. Cl.
*A61F 2/30* (2006.01)
*A61F 2/38* (2006.01)
*A61F 2/46* (2006.01)

(52) U.S. Cl.
CPC .......... *A61F 2/389* (2013.01); *A61F 2/30756* (2013.01); *A61F 2/3859* (2013.01);
(Continued)

(58) Field of Classification Search
CPC .................................................. A61F 2/30756
See application file for complete search history.

(56) References Cited

U.S. PATENT DOCUMENTS 4,997,445 A * 3/1991 Hodorek ............. A61F 2/30907
623/23.51
6,132,468 A 10/2000 Mansmann
(Continued)

FOREIGN PATENT DOCUMENTS

AU    2012373272 B2    2/2017
CN    211023030 U    7/2020
(Continued)

OTHER PUBLICATIONS

Written Opinion and International Search Report dated Feb. 16, 2017 issued in co-pending International Application No. PCT/US2016/055403 (18 pages).
(Continued)

*Primary Examiner* — Marcia L Watkins
(74) *Attorney, Agent, or Firm* — Volpe Koenig

(57) ABSTRACT

An implant for use in a medical procedure includes an anchor body and a flexible material. The anchor body includes a perimeter sidewall having an upper free edge, an outer surface, and an inner surface. The anchor body also includes a bottom wall, connecting the sidewall on one edge, which has an inner surface and an outer surface. The inner surfaces of the sidewall and bottom wall define a cavity and the upper free edge of the sidewall defines a top opening into the cavity. The flexible material is connected to the anchor body and is positioned in the cavity with at least a portion extending out of the top opening.

24 Claims, 26 Drawing Sheets

(52) U.S. Cl.
CPC ............... *A61F 2002/30011* (2013.01); *A61F 2002/30014* (2013.01); *A61F 2002/3007* (2013.01); *A61F 2002/30075* (2013.01); *A61F 2002/30235* (2013.01); *A61F 2002/30332* (2013.01); *A61F 2002/30337* (2013.01); *A61F 2002/305* (2013.01); *A61F 2002/30578* (2013.01); *A61F 2002/30604* (2013.01); *A61F 2002/30769* (2013.01); *A61F 2002/30878* (2013.01); *A61F 2002/30971* (2013.01); *A61F 2002/30973* (2013.01); *A61F 2002/30985* (2013.01); *A61F 2002/3895* (2013.01); *A61F 2/461* (2013.01); *A61F 2310/00023* (2013.01)

(56) References Cited

U.S. PATENT DOCUMENTS

| | | | |
|---|---|---|---|
| 6,315,798 B1* | 11/2001 | Ashby | A61F 2/3877 623/20.17 |
| 6,454,811 B1 | 9/2002 | Sherwood et al. | |
| 6,530,956 B1 | 3/2003 | Mansmann | |
| 6,626,945 B2 | 9/2003 | Simon et al. | |
| 6,629,997 B2 | 10/2003 | Mansmann | |
| 6,632,246 B1 | 10/2003 | Simon et al. | |
| 7,476,250 B1 | 1/2009 | Mansmann | |
| 7,837,740 B2* | 11/2010 | Semler | A61F 2/30756 623/23.51 |
| 8,292,968 B2* | 10/2012 | Truncale | A61F 2/28 623/23.51 |
| 8,652,173 B2 | 2/2014 | Mansmann | |
| 8,814,871 B2 | 8/2014 | Mansmann | |
| 9,095,641 B2* | 8/2015 | Albertorio | A61L 27/56 |
| 9,744,043 B2* | 8/2017 | Chen | A61B 17/1604 |
| 9,907,663 B2* | 3/2018 | Patrick | A61F 2/30756 |
| 2002/0173855 A1 | 11/2002 | Mansmann | |
| 2002/0183845 A1 | 12/2002 | Mansmann | |
| 2004/0133275 A1 | 7/2004 | Mansmann | |
| 2004/0230315 A1 | 11/2004 | Ek | |
| 2005/0287187 A1 | 12/2005 | Mansmann | |
| 2006/0178748 A1* | 8/2006 | Dinger, III | A61B 17/1615 623/18.11 |
| 2006/0235542 A1* | 10/2006 | Hodorek | A61F 2/30756 623/23.51 |
| 2007/0142914 A1 | 6/2007 | Jones et al. | |
| 2007/0150068 A1* | 6/2007 | Dong | B22F 3/1146 623/22.32 |
| 2007/0224238 A1 | 9/2007 | Mansmann et al. | |
| 2007/0293947 A1 | 12/2007 | Mansmann | |
| 2008/0306608 A1* | 12/2008 | Nycz | A61B 6/481 623/23.57 |
| 2009/0132047 A1 | 5/2009 | Mansmann et al. | |
| 2009/0312842 A1* | 12/2009 | Bursac | A61F 2/30756 623/23.72 |
| 2010/0016981 A1* | 1/2010 | Roger | A61F 2/389 606/86 R |
| 2011/0153028 A1* | 6/2011 | Albertorio | A61L 27/56 623/23.63 |
| 2011/0224801 A1* | 9/2011 | Mansmann | A61F 2/30756 623/23.72 |
| 2012/0253474 A1* | 10/2012 | Klein | A61F 2/28 623/23.76 |
| 2013/0006354 A1* | 1/2013 | Pressacco | A61F 2/30 623/11.11 |
| 2014/0135834 A1 | 5/2014 | Mansmann | |
| 2014/0257507 A1* | 9/2014 | Wang | A61F 2/389 623/20.34 |
| 2014/0324169 A1 | 10/2014 | Maher et al. | |
| 2015/0265408 A1 | 9/2015 | Mansmann | |
| 2016/0287392 A1 | 10/2016 | Patrick et al. | |
| 2017/0100251 A1 | 4/2017 | Ek et al. | |
| 2018/0271659 A1 | 9/2018 | Mansmann et al. | |
| 2018/0289493 A1 | 10/2018 | Mansmann | |
| 2022/0409379 A1* | 12/2022 | Mansmann | A61F 2/30749 |
| 2024/0065844 A1 | 2/2024 | Mansmann | |

FOREIGN PATENT DOCUMENTS

| | | |
|---|---|---|
| ES | 2427428 T3 | 10/2013 |
| GB | 2454325 A | 5/2009 |
| WO | 2005032426 A1 | 10/2004 |
| WO | 2012162571 A1 | 11/2012 |
| WO | 2018215752 A1 | 11/2018 |

OTHER PUBLICATIONS

International Preliminary Report on Patentability dated Mar. 16, 2018 issued in co-pending International Application No. PCT/US2016/055403 (10 pages).

* cited by examiner

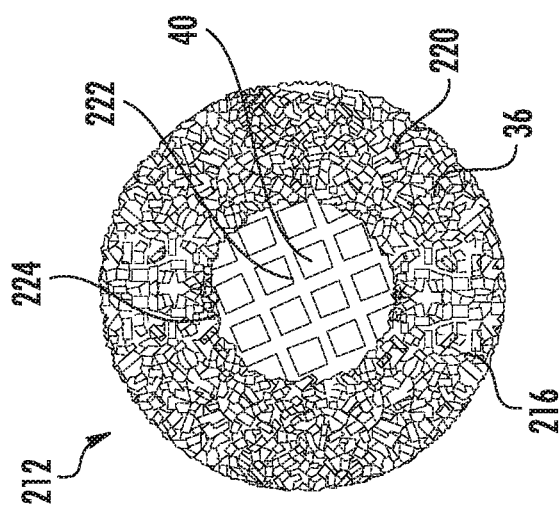
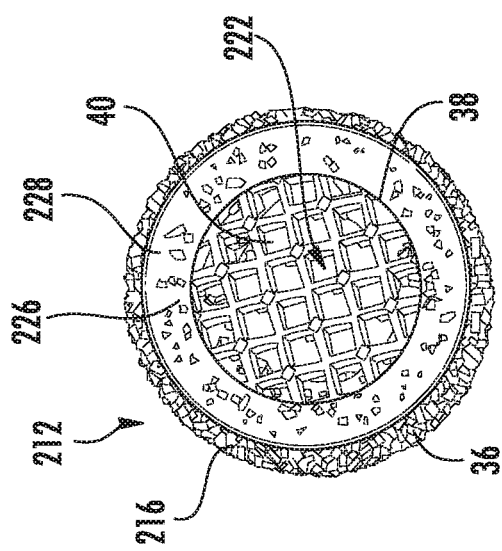
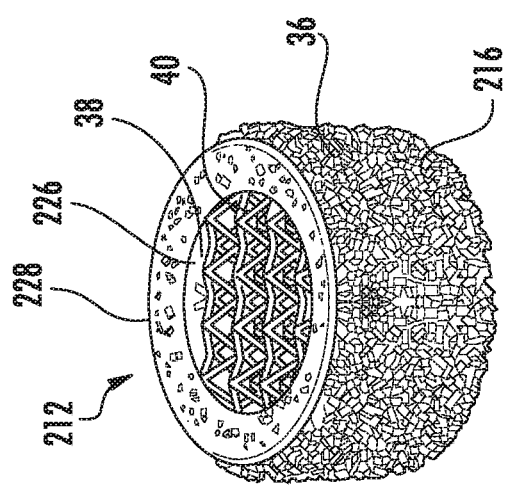

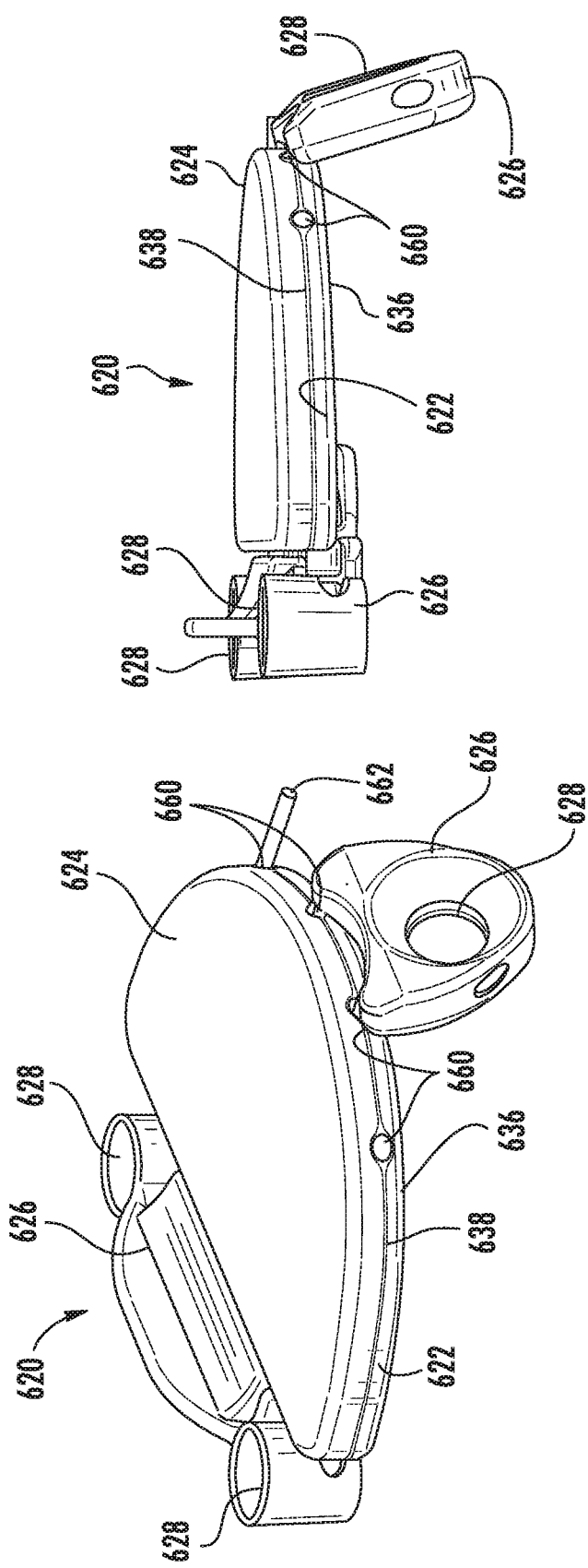

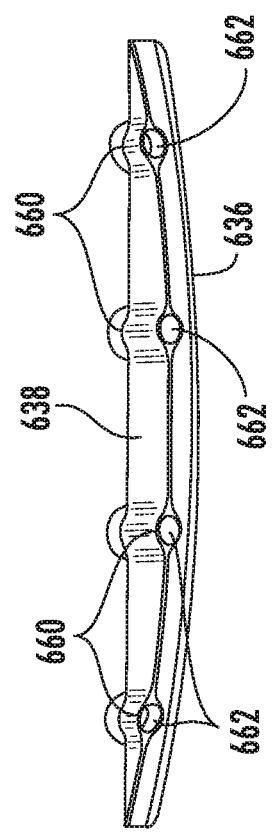
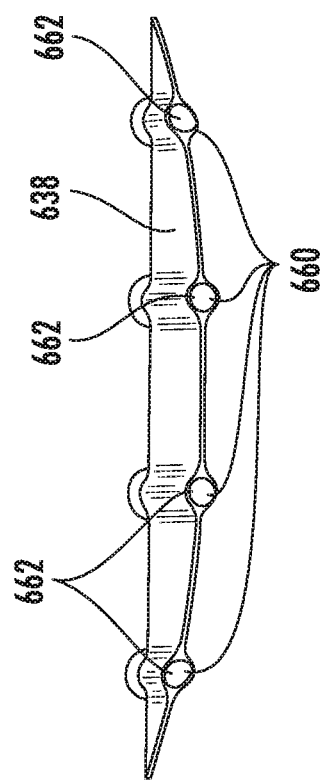

MEDICAL IMPLANT AND ANCHORING SYSTEM FOR A MEDICAL IMPLANT

CROSS REFERENCE TO RELATED APPLICATIONS

This application is the U.S. National Stage, under 35 U.S.C. § 371, of International Application No. PCT/US2016/055403 filed Oct. 5, 2016, which claims priority to U.S. Provisional Patent Application Nos. 62/237,471 and 62/237,477, both filed Oct. 5, 2015, the entire contents of both of which are hereby incorporated by reference as if fully set forth herein.

FIELD OF INVENTION

The present invention relates to medical implants, and, more particularly, to medical implants and anchoring systems for medical implants for securing a cartilage-like material to a bone.

BACKGROUND

Cartilage is a flexible and relatively soft biological material that generally protects relatively hard bone, especially in the area of joints where bone is likely to be contacted by other hard surfaces. Natural cartilage forms a thin layer, usually in the range of 1-4 mm thick, which covers certain bone surfaces. Over time, cartilage deteriorates and becomes damaged due to use or other conditions. This is especially a problem of hyaline cartilage, a material that is found in articulating joints, including knees, hips, and shoulders in humans. For a variety of reasons, such cartilage is not as self-sustaining as other tissues, which leads to a need for repair and/or prosthetic replacement procedures, especially in the elderly.

As explained in U.S. Patent Application Publication No. 2007/0224238, the entire contents of which is incorporated by reference as if fully set forth herein, hyaline cartilage is the main type of cartilage that provides smooth, slippery, lubricated surfaces that slide over and rub against other cartilage surfaces in "articulating" joints, such as knees, hips, shoulders, etc. Natural hyaline cartilage forms as a relatively thin layer (usually no more than about 3 or 4 millimeters thick) that covers certain surfaces of hard bones. While the hyaline cartilage in some joints (such as fingers) is not heavily stressed, the hyaline cartilage in other joints (notably including knees and hips) is frequently and repeatedly subjected to relatively heavy compressive loads, shear forces, and other stresses. Such cartilage does not have a blood supply or cellular structure that enables the type of cell turnover and replacement that occurs in many other tissues. As a result of those and other factors, hyaline cartilage in knees and hips may need repair or prosthetic replacement at fairly high rates among the elderly (due to gradual wear, injury, disorders such as osteoarthritis or rheumatoid arthritis, etc.), and at lower but considerable rates among younger patients (due to injury, congenital joint displacements that lead to unusual wear patterns, etc.).

It is important to recognize that hyaline cartilage is present only in relatively thin layers that coat the surfaces of bones. Since it is a soft tissue that cannot repair itself, it is vulnerable to damage when subjected to repeated loadings and stresses.

A bone surface that is covered by a layer of hyaline cartilage may be referred to herein as a "condyle." However, it should be noted that this term is not always used consistently, by physicians and researchers. Some users limit "condyles" to the rounded ends of elongated bones. This usage includes the long bones in the arms and legs; it usually but not always includes smaller elongated bones in the hands, fingers, feet, and toes; and it normally excludes the cartilage-covered "sockets" in the ball-and-socket joints of the hips and shoulders (while encompassing the complementary ball ends of the other bone that fits such a socket). By contrast, other authors use "condyle" to refer to any bone surface covered by hyaline cartilage, including the socket surfaces in hip and shoulder joints. Since reinforced hydrogels as disclosed herein can be used to replace hyaline cartilage segments on any bone surface, the broader definition (which covers any bone surface covered by hyaline cartilage, including long bones, finger joints, socket surfaces in hips and shoulders, etc.) is used herein.

A condylar surface (i.e., a hyaline cartilage-carrying bone surface) contains a transition zone, called the subchondral layer or zone, at the interface between the hard bone and the cartilage. This transition zone strengthens and reinforces the cartilage, ensuring that the cartilage (which is relatively soft) is not readily pushed or scraped off the supporting bone when a joint is subjected to loading and shearing stresses. In the transition zone, large numbers of microscopic collagen fibers, firmly anchored in the hard bone, emerge from the bone in an orientation that is generally perpendicular to the bone surface at that location.

When rounded surfaces are involved, a direction normal to the surface may be called radial; the surface-parallel direction at any point on a rounded surface is called tangential. For convenience, the descriptions and drawings herein typically assume a cross section wherein a bone surface is positioned horizontally, with a layer of cartilage resting above it and on top of it, and with the smooth articulating surface of the cartilage as the upper exposed surface of the structure. This orientation is for convenience of description, often with reference to an illustration. Unless otherwise stated, adjectives such as up/down, over/under, above/below and similar limitations should be taken as referring to an arrangement wherein the bone is assumed to be the base or lower tissue unless otherwise described, or according to a depiction in the drawings, and should not be regarded as limiting features of the subject invention. The joint might be oriented in any direction at a given time.

Bone is a relatively rigid biological material compared to cartilage. There are different typical rigidities of bones in the functional skeleton, corresponding to a large extent to the mechanical demands of the segment of bone, as outlined by Wolff's Law. Subchondral bone, the bone directly adherent to a cartilage layer at the joint surface, is comprised of a thin dense layer of bone. Less dense woven bone supports the subchondral joint articular surface. Dense cortical bone is found in the long bones for structural support.

Meniscal cartilage refers to specialized arc-shaped segments that help stabilize the knee and shoulder joints. Like hyaline cartilage (and unlike elastic cartilage or spinal cartilage), menisci have smooth lubricated surfaces that slide and rub against other cartilage surfaces, when a joint is articulating. They are made of a highly fibrous form of cartilage. Implants to replace meniscal cartilage are affixed to hard bone mainly via long fibers that extend out of the tips of the arcs, while the peripheral surfaces of the arcs are affixed to soft tissues instead of bone. In the shoulder joints, these arc segments are called labrum (or labral) segments; however, since their shapes and structures are nearly identical to meniscal segments in knees, and since labral cartilage in shoulders need to be repaired only rarely compared to meniscal cartilage in knees, labral cartilage is here included in the definition of the term "meniscal cartilage."

Because of their function to bear lateral loading around arc shapes, meniscal cartilage segments have roughly triangular cross-sections, and their center regions have greater thickness than the hyaline cartilage layers that cover the surfaces of bones in joint regions.

Cartilage Disorders

Based upon mechanical, tribological and pilot animal data, the present inventor is continuing to develop novel, hydrogel-based therapeutic devices and techniques, to improve the treatment options available for progressive osteoarthritis (OA) and post-traumatic osteoarthritis (PTOA). An object is to repair irreversibly damaged articular bearing surfaces so as to improve function and reduce the progression, pain, suffering, care and expenses associated with arthritis.

OA/PTOA can impact any joint, with variable disability impact. Although PTOA differs from OA in etiology, age of onset, associated pathologies and index injury treatment focus, both conditions can result in extensive damage to articular cartilage. Once damage to articular cartilage occurs, conservative management (e.g., anti-inflammatory drugs, braces and visco-supplementation) has only marginal temporizing, palliative success. There are currently no successful, minimally invasive interventions in use for early end stage, bone on bone, joint pathologies that predictably forestall or possibly wholly avert the need for total joint replacement (TJR) or joint arthrodesis (JA). Conventionally, TJR is the definitive procedure for OA/PTOA of the hip, knee and shoulder while joint fusion (JA) is an acceptable alternative for smaller synovial joints and as salvage, last resort alternative for complications of the shoulder, hip or knee. Though a very successful procedure, TJR is associated with an open surgical approach, complete replacement of the natural joint, and typically requires a significant hospitalization with post-surgery rehabilitation.

Hydrogels for Treating Cartilage Disorders

The present invention relates to certain specific techniques and structural designs for anchoring devices and systems to fix hydrogel components of implants. Natural hyaline cartilage is present only in relatively thin layers that coat the surfaces of bones and diffuse into the bone tissue for affixation to the bone.

Most hydrogels that have substantial tensile strength, which are the hydrogels of most interest herein, hold water molecules within a cohesive polymeric molecular matrix, in a way that enables migration and diffusion of the water molecules through the molecular matrix. Although such hydrogel materials have at least some degree of deformability for purposes of elasticity, they cannot be in liquid form, i.e., they advantageously return to a specific non-deformed shape after loads or stresses have been removed.

For the purposes of this invention, synthetic hydrogel polymers are advantageously flexible, and can be rolled into cylindrical forms that can be inserted into a joint that is being surgically repaired, via a minimally invasive incision, using an arthroscopic insertion tube. By avoiding and eliminating the need for "open joint" surgery, arthroscopic insertion of a flexible implant in a rolled-up cylindrical form can spare surrounding tissues and blood vessels from more severe damage during an open joint surgical operation.

Due to these and other factors, hydrogel materials are of interest in joint repair implants, and may be able to provide better performance than the solid plastics, such as ultra-high molecular weight polyethylene ("UHMWPE") that are used today in many hip and knee replacements.

In natural cartilage, the hydrogel structure is created by a three-dimensional matrix that is given shape and strength mainly by collagen. Collagen is a fibrous protein that holds together nearly all soft tissues in animals. In synthetic hydrogels, the three-dimensional matrix usually has a molecular structure made of complex polymers that have a combination of: (i) long continuous chains (often called "backbone" chains), containing mainly carbon atoms and sometimes containing oxygen, nitrogen, sulfur, or other atoms as well; (ii) side chains, which branch off the backbone chains in ways that can have either controlled or semi-random spacing, length, content, etc.; and (iii) cross-linking bonds, which connect the backbone and side chains to each other in ways that create complex three dimensional molecules that have sufficient spacing between them to allow water molecules to travel within the molecular matrix.

Synthetic hydrogel polymers advantageously are hydrophilic, to cause them to attract and hold water molecules. This can be accomplished by including large numbers of oxygen atoms (usually in hydroxy groups), nitrogen atoms, or other non-carbon atoms in the backbone and/or side chains, to provide "polar" groups that will attract water, a polar liquid.

Fluid permeability (which involves the ability of water to pass through the molecular matrix of cartilage) is important in the behavior and performance of natural cartilage. As an example, FIG. 6 in U.S. Pat. No. 6,530,956 illustrates how fluid flow through cartilage can help distribute stresses and pressures that are imposed on cartilage in a load-bearing joint such as a knee, when a person is walking or running.

Due to these and other factors, hydrogel materials are of interest in joint repair implants, and may be able to provide better performance than the solid plastics (such as high molecular weight polyethylene, abbreviated as UHMWPE) that are used today in most hip and knee replacements.

The recent and ongoing efforts to provide improved hydrogel implants for replacing cartilage in joints are described in the inventor's patents and patent applications such as U.S. Pat. No. 6,629,997 ("Meniscus-Type Implant With Hydrogel Surface Reinforced By Three-Dimensional Mesh") and published applications U.S. 2002/0173855 ("Cartilage Repair Implant With Soft Bearing Surface And Flexible Anchoring Device"), U.S. 2002/0183845 ("Multi-Perforated Non-Planar Device For Anchoring Cartilage Implants And High-Gradient Interfaces"), U.S. 2004/0133275 ("Implants For Replacing Cartilage, With Negatively-Charged Hydrogel Surfaces And Flexible Matrix Reinforcement"), all of which are hereby incorporated by reference in their entireties as though fully set forth herein.

To employ soft hydrogel in an implant to replace damaged cartilage, it is advantageous to anchor the hydrogel to the associated bone articulating surface in such a way as to promote healing of the hydrogel implant to the bone recipient site, i.e., to secure the implant that carries the hydrogel surface exposed for sliding articulation. There is a significant modulus of elasticity mismatch in structural characteristics between the cartilage, with relatively soft fragile material properties, and the subchondral bone, with relatively tough rigid material properties.

Because hydrogel polymers (which contain substantial quantities of water molecules) will inevitably be weaker than various known types of hard plastics that do not contain any free water, the work by Mansmann, the present inventor, has focused on hydrogels that are reinforced by three-dimensional fiber arrays, made of synthetic fibers having high tensile strength.

Difficulty in anchoring these composite fiber reinforced hydrogels to bone has been encountered, with the difficulty centered at the hydrogel anchor interface and the bone anchor interface.

3-D Printing

3-D printing, also known as digital additive manufacturing, or simply additive manufacturing, has made tremendous advances over the past several years. In conjunction with the improved metal laser sintering and e-beam focused additive manufacturing technologies, software has improved providing design engineers with the technical ability to better design the products necessary for improved functional structures. Autodesk™ software and 3-D systems have competing technologies for design and production of improved functional structures through improved software and additive manufacturing technologies. Two leading technologies for additive manufacturing particularly relevant to the herein disclosed invention are direct metal laser sintering (DMLS) and electron beam melting (EBM).

The following paragraphs are quoted from Wikipedia describing these processes.

"Direct metal laser sintering (DMLS) is an additive manufacturing technique that uses a carbon dioxide laser fired into a magnesium substrate to sinter powdered material (typically metal), aiming the laser automatically at points in space defined by a 3D model, binding the material together to create a solid structure. It is similar to selective laser sintering (SLS); the two are instantiations of the same concept but differ in technical details. Selective laser melting (SLM) uses a comparable concept, but in SLM the material is fully melted rather than sintered, allowing different properties (crystal structure, porosity, and so on). DMLS was developed by the EOS firm of Munich, Germany."

"The DMLS process involves use of a 3D CAD model whereby a .stl file is created and sent to the machine's software. A technician works with this 3D model to properly orient the geometry for part building and adds supports structure as appropriate. Once this "build file" has been completed, it is "sliced" into the layer thickness the machine will build in and downloaded to the DMLS machine allowing the build to begin. The DMLS machine uses a high-powered 200 watt Yb-fiber optic laser. Inside the build chamber area, there is a material dispensing platform and a build platform along with a recoater blade used to move new powder over the build platform. The technology fuses metal powder into a solid part by melting it locally using the focused laser beam. Parts are built up additively layer by layer, typically using layers 20 micrometres thick. This process allows for highly complex geometries to be created directly from the 3D CAD data, fully automatically, in hours and without any tooling. DMLS is a net-shape process, producing parts with high accuracy and detail resolution, good surface quality and excellent mechanical properties."

"Electron beam melting (EBM) is a type of additive manufacturing (AM) for metal parts, originally patented and developed by Arcam. ASTM classifies EBM as a powder bed fusion technique, which also includes selective laser melting (SLM). The main difference is that EBM uses an electron beam as its power source, as opposed to a laser. EBM technology manufactures parts by melting metal powder layer by layer with an electron beam in a high vacuum. In contrast to sintering techniques, both EBM and SLM achieve full melting of the metal powder. The term selective laser sintering (SLS) is mostly historical and is sometimes used to describe full melting or plastic processes. This solid freeform fabrication method produces fully dense metal parts directly from metal powder with characteristics of the target material. The EBM machine reads data from a 3D CAD model and lays down successive layers of powdered material. These layers are melted together utilizing a computer controlled electron beam. In this way it builds up the parts. The process takes place under vacuum, which makes it suited to manufacture parts in reactive materials with a high affinity for oxygen, e.g. titanium. The process is known to operate at higher temperatures (up to 1000° C.), which can lead to differences in phase formation through solidification and solid state phase transformation."

"The powder feedstock is typically pre-alloyed, as opposed to a mixture. That aspect allows classification of EBM with selective laser melting (SLM) where competing technologies like SLS and DMLS require thermal treatment after fabrication. Compared to SLM and DMLS, EBM has a generally superior build rate because of its higher energy density and scanning method."

These technologies are two of the current leading methods of additive manufacturing useful for the production of the hydrogel implant anchoring system as described herein. In addition, EOS has developed a proprietary technology for 3-D printing PAEK polymers, with detail definition limited to the 0.6 mm dimension. Although this is limited when compared to the metal technologies, PAEK for certain anchor design applications would be useful with the herein described hydrogel bone anchors and is included in the herein described invention.

It would be advantageous to provide "pre-arthroplasty" interventions that do not require an open joint approach, extensive hospitalization and prolonged recovery and rehabilitation times, for both military and public needs.

SUMMARY

In one aspect, it is an object of the present disclosure to facilitate arthroscopic joint resurfacing of bone-on-bone synovial joint pathologies using a hydrogel, before progressive bone erosion manifests to cause joint deformities indicating more drastic treatment is necessary.

In another aspect, the present invention is directed to fixedly securing a flexible material such as a hydrogel to a bone overcoming one or more problems associated with the existing solutions, as well as providing additional features which address the issue of total joint replacement and open surgery being the common approach to cartilage repair and replacement.

The present invention provides for an improved anchoring system to deliver and securely anchor a hydrogel medical device to replace damaged cartilage in a mammalian joint, using an anchor having a hollow or shelled out interior, such as an internal cavity, to optimize the secure fixation of the bone anchor to the cartilage replacing hydrogel to enhance the longevity of the connection between the anchor and the hydrogel being anchored. The present invention also discloses how an anchor according to an embodiment of the invention can be assembled in an array to support a larger sheet of hydrogel to resurface an entire joint surface.

Another object of this invention is to provide improved methods of stable secure fixation of a soft polymer or hydrogel bearing surface to a relatively rigid bone recipient site establishing a modulus of elasticity gradient from the rigid bone to the compliant bearing surface, resulting in a stable replacement device for damaged cartilage in an arthritic joint.

Another object of the invention is to provide a method of securing a rigid bone anchor to a relatively flexible cartilage replacement bearing surface by creating a hollow/shelled out anchor which accommodates an extension of the soft bearing surface into the bone anchor, resulting in an enhanced fixation of the connection of the anchor to the softer hydrogel, and enhanced performance of the thickened hydrogel.

Another object of the invention is to provide a method to disclose a method of securing a larger sheet of hydrogel with an array of hollow/shelled out anchors with extensions of the hydrogel into the hollow/shelled out anchor enhancing the connection between the cartilage replacement hydrogel/polymer and the array of bone anchors.

Another object of the invention is the delivery and secure, stable anchoring fixation of a hydrogel or polymer bearing surface into a synovial joint for replacing damaged cartilage in mammalian joints.

Another object of the invention is the delivery and secure, stable anchoring fixation of a hydrogel or polymer bearing surface into a synovial joint for replacing damaged cartilage in mammalian joints, such that host recipient site tissue healing occurs in such a manner as to engage the device anchoring mechanism.

Another object of this invention is to reduce the stresses experienced at the implant bone interface through the rigid anchoring of the device to the recipient bone.

Another object of this invention is to increase the longevity of the composite gel and the hollow/shelled out medical device anchor during physiologic function.

Another object of the invention is to reduce the stresses, during normal physiologic joint motion, experienced by cartilage, of the articulating joint surfaces of the femur and tibia thereby reducing arthritic wear of the cartilage of these surfaces.

Another object of the invention is to reduce the stresses, during normal physiologic joint motion, experienced by implantable devices to replace damaged cartilage, of the articulating joint surfaces of the femur and tibia, of the knee, as well as the articulating surfaces of other bones forming the articulating surfaces of other mammalian synovial joints, thereby increasing the longevity of these implants.

The present invention provides, in an aspect, a hydrogel medical device is fabricated with an integral anchor having an anchor that is hollow and/or shelled out with a cavity into which hydrogel flows during a molding process and fills the bone anchor cavity while within the mold. This molding process of the hydrogel onto and affixed within a portion of the bone anchor results in the permanent fixation of the hydrogel to the anchor. The molded device can be delivered into an arthritic joint through a minimal incision. Once delivered, the device can be installed with secure, stable fixation of the bone anchor to rigid bone tissues at the implant recipient site and thereby securing the hydrogel bearing surface to the bone to replace the damaged cartilage surface. The molding flow and extension of the hydrogel into the bone anchor cavity provides that the hydrogel is securely affixed and gripped by the anchor. The anchor is fixed rigidly to bone and thereby fixes the hydrogel rigidly to bone.

It is another object of the present disclosure to facilitate arthroscopic joint resurfacing of bone-on-bone synovial joint pathologies using a hydrogel, before progressive bone erosion manifests to cause joint deformities indicating more drastic treatment is necessary.

The present invention further provides, in another aspect, for a bone anchoring system with an improved gel anchor interface coupled with an improved anchor bone interface, to securely fix the lubricious load bearing hydrogel directly to bone through a layered 3-D printed anchor interface.

The methods disclosed herein can, in certain aspects, employ a 3-D printed anchor of the proper shape, size and thickness for securely fixing all or at least a portion of a meniscal segment.

The present invention further provides, in another aspect, an anchor that has at least a portion porous enough to permit the passage of a flexible material for replacing cartilage such as a hydrogel into the pores of an adhesion or attachment layer, during the molding process. The anchor further includes a barrier layer to prevent the flow of the hydrogel into the pores of a bone healing layer of the anchor that is generally positioned on an opposite side from the adhesion layer. The adhesion layer may preferably be designed with pores greater than 0.4 mm for accepting a hydrogel during molding, to enable the anchor to securely grip the hydrogel replacement layer for replacement of the damaged cartilage. The porosity may be determined by a lattice design (such as a lattice defined as the 3-D spatial orientation of the array of struts connected to create a latticework of connected struts) for the hydrogel adhesion, strut (strut defined as the individual structural member assembled together to create a lattice) thickness between 0.2 and 0.6 mm, which determine the structure of the lattice, the thickness of the gel adhesion layer between 1.5 mm and 3 mm and the space between the struts, the actual pores (pores defined as the empty spaces between individual or collection of struts in a lattice). An anchor according to the present invention may also be designed with a bone healing layer for permanent bone healing, with pores sized between 0.15 mm and 0.45 mm. The strut thickness (0.2-0.6 mm), "trabecular" (trabecular referring to the orthopedic term used to describe bone anatomic architecture) lattice structure, layer thickness (min 0.5 mm) and pore size (0.15-0.5 mm) to optimize bone healing. Restriction of hydrogel flow from the hydrogel adhesion layer to the bone healing layer can be accomplished with a change in the porosity at the junction of the gel adhesion and bone healing layer, creating a barrier layer, to prevent the flow or passage of hydrogel across this barrier junction. Alternatively a solid barrier layer can be incorporated into the design, such as in the file for a 3-D printing process, with overlap between the gel adhesion and the bone healing layers into the solid barrier layer. This design increases the strength of the three layers printed together, with overlap of the layers, preventing any void weaknesses, thereby enhancing implant anchor strength. This overlap enhances to implant anchor strength from the gel adhesion layer, through the solid barrier/binding layer, to the bone healing layer.

Digital additive manufacturing (3D printing) is advantageously used to form anchoring structures of metal or other materials, wherein the anchoring structures comprise small but intricate internal supporting lattices, and are incorporated together with a molding barrier layer, during an additive manufacturing process employing plural materials, finally being infused with hydrogel during a molding process that results in a durably joined hydrogel surface, merged into a lattice (up to the barrier layer) and a bone growth layer joined to the lattice.

Another object of this invention is to securely anchor to bone a hydrogel prosthetic cartilage to replace damaged cartilage, with a 3-D printed anchor with one layer of a pore size greater than 0.4 mm for a hydrogel infusion, resulting in secure adhesion of the hydrogel to the anchor with the hydrogel facing one exposed surface of the cartilage replacement. The anchor has at least one further layer, preferably formed integrally with the hydrogel-infusion layer but the further layer has a pore size between 0.15 mm and 0.5 mm for bone tissue healing, facing the opposite exposed surface. In an advantageous arrangement, a barrier layer blocks infusion of the hydrogel into the further layer during molding. This implant can be embodied in or formed as a press fit plug, a threaded implant to be screwed into the bone, as well as secured with adjunct staples, pins and screws.

Another object of the invention is to provide a relatively thin anchor with a layered construction of variable porosity to enhance gel adhesion and bone healing with a barrier layer to prevent gel flow from the gel adhesion layer into the bone healing layer during the molding process.

Another object of this invention is to reduce the stresses experienced at the hydrogel interface between the anchor and the gel to enable long term functional survival of the implant.

Another object of this invention is to increase the longevity of the composite gel, and 3-D printed medical device during physiologic function.

Another object of the invention is to reduce the stresses, during normal physiologic joint motion, experienced by cartilage, of the articulating joint surfaces of the femur and tibia thereby reducing arthritic wear of the cartilage of these surfaces.

Another object of the invention is to reduce the stresses, during normal physiologic joint motion, experienced by implantable devices to replace damaged cartilage, of the articulating joint surfaces of the femur and tibia thereby increasing the longevity of these implants.

In one aspect, the present disclosure is directed to an implant for use in a medical procedure. The implant includes an anchor body and a flexible material. The anchor body includes a perimeter sidewall having a upper free edge, an outer surface, and an inner surface, and a bottom wall, connecting the sidewall on one edge, having an inner surface and an outer surface. The anchor body also includes a cavity defined by the inner surfaces of the sidewall and bottom wall, and a top opening into the cavity bordered by the upper free edge. The flexible material is connected to the anchor body and is positioned in the cavity and has at least a portion extending out of the top opening.

In another aspect the present disclosure is directed to another implant for use in a medical procedure. The implant includes a plurality of anchors, each including an anchor body. The anchor bodies each include a perimeter sidewall having a upper free edge, an outer surface, and an inner surface, a bottom wall having an inner surface and an outer surface, a cavity defined by the inner surfaces of the sidewall and bottom wall, and a top opening into the cavity bordered by the upper free edge. A flexible material is connected to the plurality of anchors and is positioned in the anchor body cavities and extends out of the top openings. The flexible material forms a pad having a bottom surface which covers the plurality of anchor top openings.

In another aspect, the present disclosure is directed to a medically-implantable anchor for attaching a flexible material to a bone. The anchor includes a bone attachment layer having a porous structure for facilitating attachment to a bone via bony ingrowth, a flexible material attachment layer having a porous structure for receiving the flexible material and helping to retain the flexible material to the anchor, and a barrier layer sandwiched between the bone attachment layer and the flexible material attachment layer and being impermeable by the flexible material. The bone attachment layer forms a first surface of the anchor and the barrier layer is shaped as a container to include a bottom wall and a sidewall extending away from the bottom wall. Inner surfaces of the bottom wall and sidewall define a cavity configured to receive the flexible material, and the flexible material attachment layer is positioned in the cavity.

In a further aspect, the present disclosure is directed to a method of manufacturing an implant for use in a medical procedure. The method includes providing an anchor body. The anchor body includes a perimeter sidewall having a upper free edge, an outer surface, and an inner surface, a bottom wall, connecting the sidewall on one edge, having an inner surface and an outer surface, a cavity defined by the inner surfaces of the sidewall and bottom wall, and a top opening into the cavity bordered by the upper free edge. The method further includes attaching a flexible material in the cavity, at least a portion of the flexible material extending out of the top opening.

In yet another aspect, the present disclosure is directed to a method of manufacturing an implant for use in a medical procedure. The method includes providing a plurality of anchors each having an anchor body. The anchor bodies each include a perimeter sidewall having a upper free edge, an outer surface, and an inner surface, a bottom wall having an inner surface and an outer surface, a cavity defined by the inner surfaces of the sidewall and bottom wall, and a top opening into the cavity bordered by the upper free edge. The method also includes attaching a flexible material to the plurality of anchors by positioning the flexible material in the anchor body cavities such that a portion of the flexible material extends out of the top openings, the flexible material forming a pad having a bottom surface which covers the plurality of anchor top openings.

In yet another aspect, the present disclosure is directed to a method of treating a cartilage disorder in a synovial joint. The method includes preparing the site for receiving an implant and providing the implant. The implant includes an anchor having an anchor body. The anchor body includes a perimeter sidewall having a upper free edge, an outer surface, and an inner surface, a bottom wall, connecting the sidewall on one edge, having an inner surface and an outer surface, a cavity defined by the inner surfaces of the sidewall and bottom wall, and a top opening into the cavity bordered by the upper free edge. The implant further includes a flexible material affixed to the anchor with at least a portion in the cavity. The method further includes affixing the implant to a bone at or adjacent the implant site such that the flexible material is positioned to act as cartilage in the synovial joint.

BRIEF DESCRIPTION OF THE DRAWINGS

The foregoing Summary and the following detailed description will be better understood when read in conjunction with the appended drawings, which illustrate a preferred embodiment of the invention. In the drawings:

FIGS. 11A-11C are perspective views of another anchor showing an alternative layered structure according to an embodiment of the present invention;

FIGS. 18A and 18B are perspective views of a tibia implant according to an embodiment of the present invention;

FIGS. 20A-20E are perspective views of various layers of the tibia implant of FIGS. 18A and 18B;

DETAILED DESCRIPTION OF THE PREFERRED EMBODIMENTS

Figure 2A:
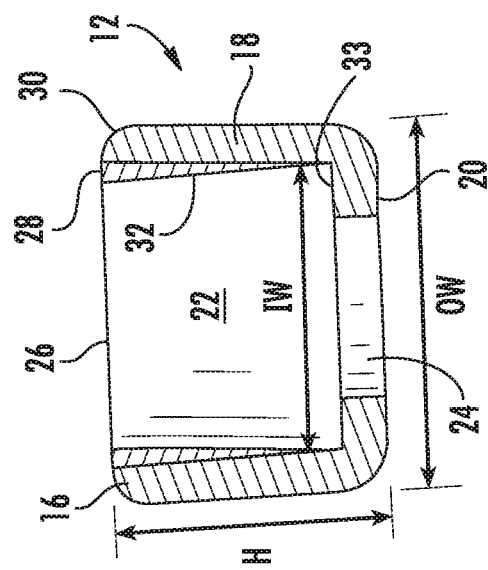
FIGS. 2A and 2B are cross-sectional views of an anchor of the medical implant of FIGS. 1A and 1B.

The description provided herein is to enable those skilled in the art to make and use the described embodiments set forth. Various modifications, equivalents, variations, combinations, and alternatives, however, will remain readily apparent to those skilled in the art. Any and all such modifications, variations, equivalents, combinations, and alternatives are intended to fall within the spirit and scope of the present invention defined by claims.

Certain terminology is used in the following description for convenience only and is not limiting. The words "right," "left," "top," and "bottom" designate directions in the drawings to which reference is made. The words "a" and "one," as used in the claims and in the corresponding portions of the specification, are defined as including one or more of the referenced item unless specifically stated otherwise. This terminology includes the words above specifically mentioned, derivatives thereof, and words of similar import. The phrase "at least one" followed by a list of two or more items, such as "A, B, or C," means any individual one of A, B or C as well as any combination thereof.

Disclosed embodiments relate to a medical device which includes a hollow anchor having a cavity-like recess or receiving area with a raised or surrounding sidewall, rim, ridge or lip, for attaching a cartilage-like flexible material to a bone. The anchor in one aspect includes a structure for securely attaching to the bone and in another aspect also includes a structure for securely attaching to the cartilage-like material. In this way, an anchor of the invention addresses, in one aspect, the inherent problem of securing an elastic, cartilage-like material to a hard, rigid bone.

For example, an anchor structured with a hollow core having a receiving area preferably surrounded by a wall is engineered with a cavity to be contiguous and continuous with the flexible material replacing the damaged cartilage. The flexible material is secured to the anchor through a molding process in which the flexible material flows or is otherwise positioned into the cavity of the anchor, thereby forming a flexible base and retaining the flexible material to the anchor. The anchor may include additional features, such as a particular shape or structure, which further helps to retain the flexible material.

The anchor can then be fixed securely to bone through mechanical techniques, including screw, staple and/or press fit designs. The anchor is positioned between the flexible material and the bony anatomy being repaired to securely fix the flexible material to cover the anatomic area of cartilage damage to enable secure bone anchor healing and secure, permanent fixation of the flexible material to cover the damaged joint surface.

Cylindrical Anchor

Figure 1B:
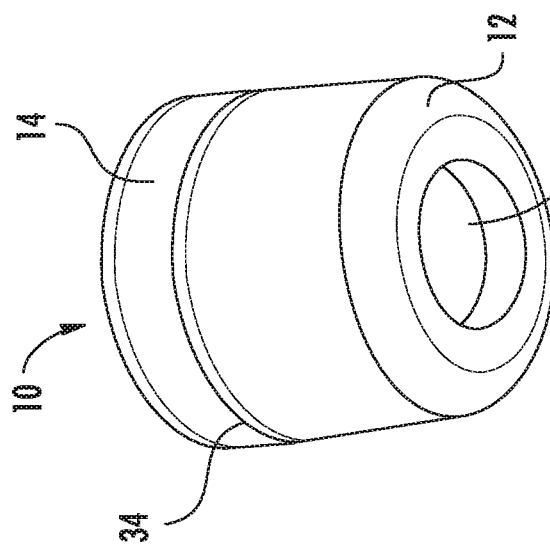
FIGS. 1A and 1B are perspective views of an exemplary medical implant, according to an embodiment of the present invention.
Figure 1A:
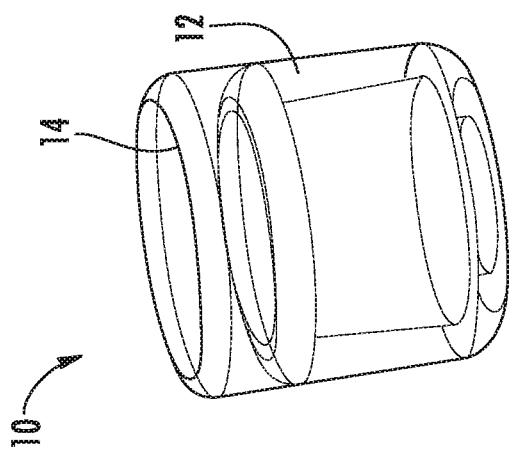

FIGS. 1A-1B illustrate perspective views of an exemplary medical implant 10. The implant 10 is configured to be implanted into the body of a human or animal during a medical procedure. In one example, the implant 10 is a device for replacing cartilage, such as hyaline cartilage in an articulating joint such as a knee, hip, or shoulder.

Figure 9C:
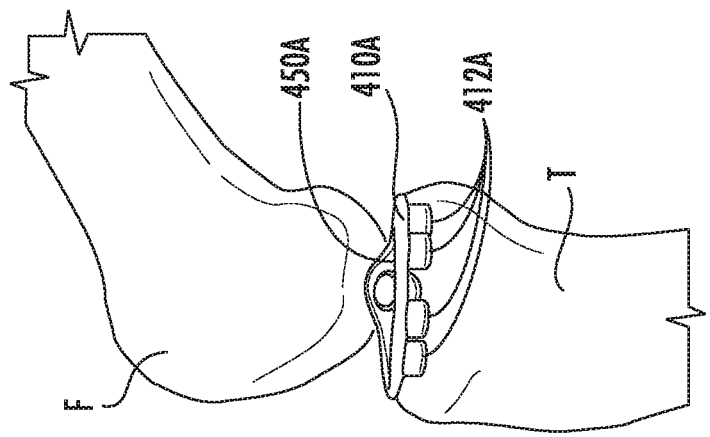
FIGS. 9A-9C illustrate a knee joint including an exemplary disclosed medical implant in position on a tibia.
Figure 9B:
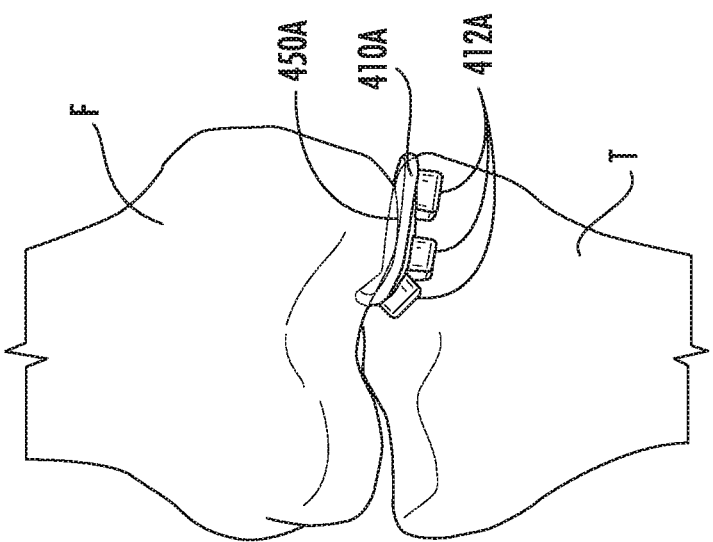
Figure 9A:
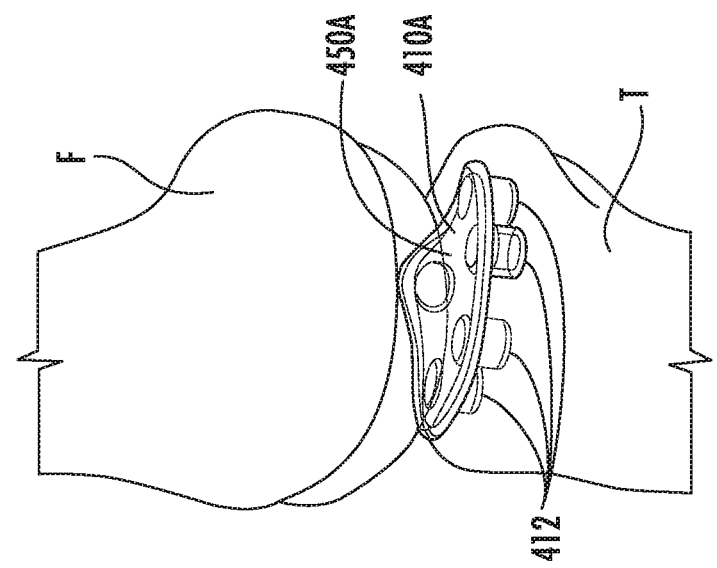
Figure 9F:
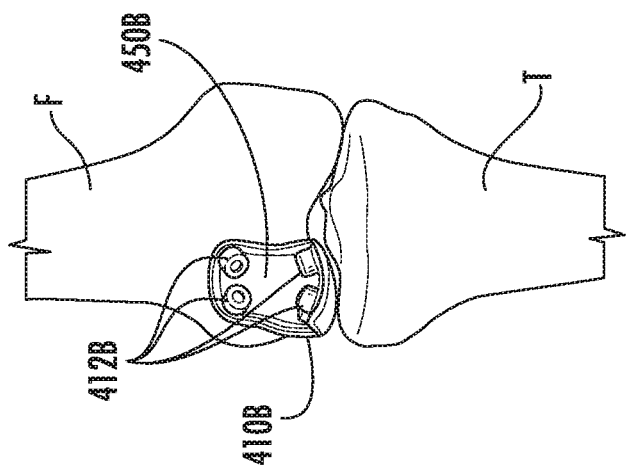
FIGS. 9D-9F illustrate a knee joint including an exemplary disclosed medical implant in position on a femur.
Figure 9E:
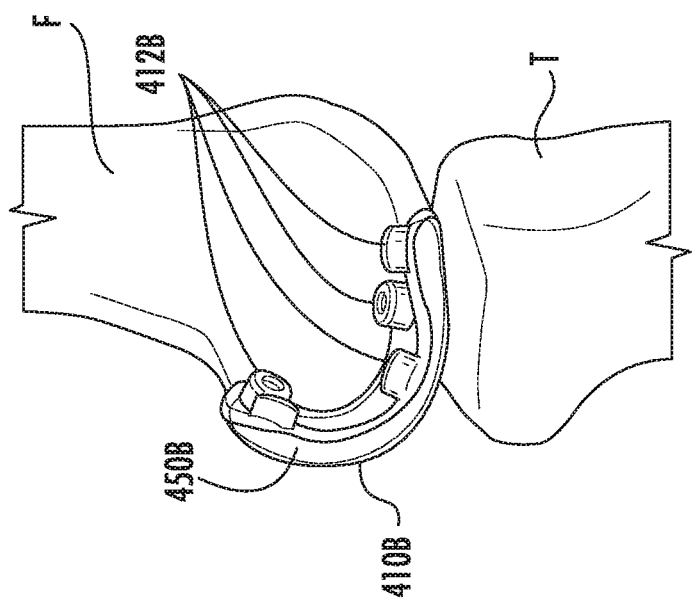
Figure 9D:
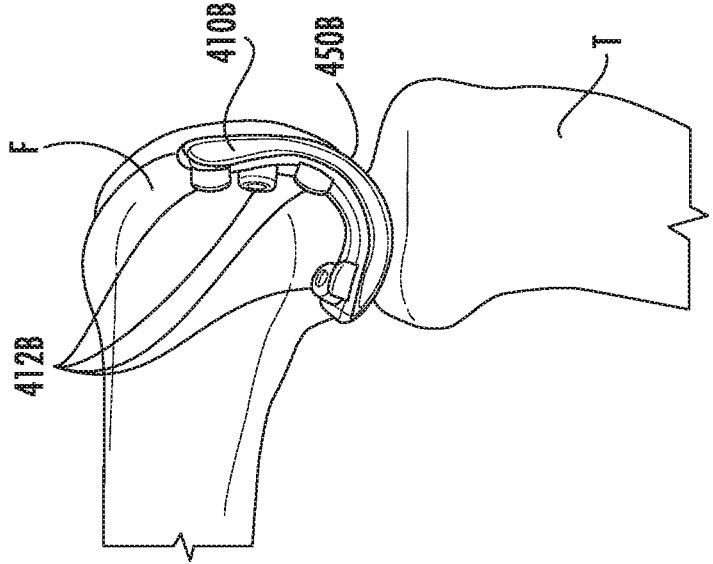

In an exemplary embodiment, the implant 10 includes a cylindrical anchor 12 configured to attach a flexible material 14 to a bone (e.g., a tibia bone T shown in FIGS. 9A-9C). The flexible material 14 is formed to act as the new, supplemental or replacement cartilage and includes properties which are consistent with such use. The flexible material 14 is preferably a flowable material that is capable of being injection molded and at least partially solidified, while still retaining a level of elasticity, to form a cartilage-like surface on a bone. In an exemplary embodiment, the flexible material 14 is a hydrogel material, such as described above. The flexible material 14 may be formed from one or more hydrogels having different properties. For example, a soft hydrogel may form a base of the flexible material 14 for attachment to the anchor as further described herein, while a thickened outer hydrogel is configured to act as a cartilage-like replacement. The flexible material 14 may also be a polymer, such as polycarbonate urethane, or other material having similar properties, as would be known to a person of skill in the art.

The anchor 12 has the task of anchoring the selected flexible material 14 to a bone. Due to the nature of the flexible material 14, it is generally difficult to securely anchor it directly to a bone. The anchor 12 includes features which allow secure attachment to the bone as well as secure attachment to the flexible material 14, thereby serving as a bridge between the two. The anchor 12 includes features which are tailored for attachment to the different materials.

The anchor 12 may be fabricated using any material which is suitable for use in a medical implant in bone. For example, the anchor 12 may be formed from titanium, titanium alloy, or other metal. In some embodiments, the entire anchor 12 may be integrally formed as one piece. In addition, it should be understood FIGS. 1A-1B illustrate only an exemplary embodiment of the implant 10, which may include other features, including different shapes, sizes, surface textures, etc., depending on use and/or placement of such an anchor in the body.

Figure 2B:
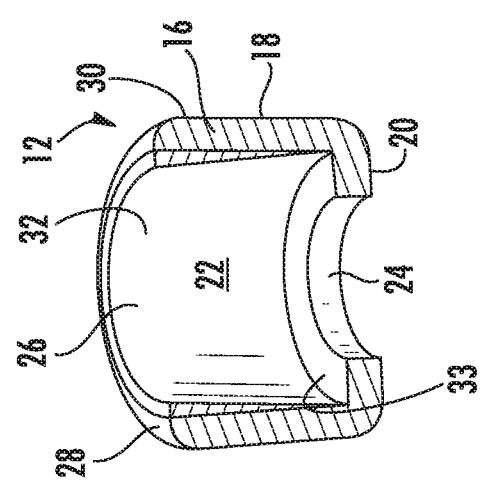

FIGS. 2A-2B further illustrate the anchor 12, including an anchor body 16, according to an embodiment of the invention. The anchor body 16 includes a perimeter sidewall 18 (also referred to as the sidewall) and a bottom wall 20 connected to the perimeter sidewall 18 on one edge, such as a lower edge, to define a cavity 22 in the interior of the anchor body 16. The sidewall 18 may preferably be an annular sidewall, such that the anchor has a generally cylindrical shape. The bottom wall 20 may further include an aperture 24 communicating with the cavity 22 and a top opening 26 into the cavity 22 defined by an upper free edge 28 of the sidewall 18. In this way, the anchor body 16 forms a hollow container section in its interior, formed by the cavity 22, which is configured to receive and retain the flexible material 14 therein in a manufacturing or assembly process. The aperture 24 may serve as an aeration hole to allow air to escape when the flexible material is introduced into the top opening 26.

The anchor 12 defines the cavity 22 which forms an interior receiving space for receiving at least a portion of the flexible material 14 during a manufacturing or assembly process. The sidewall 18 includes an outer surface 30 and an inner surface 32 which are connected at the top opening 26 by the upper free edge 28. The bottom wall 20 also includes an inner surface 33, which together with the inner surface 32, define the parameters (e.g., height, width, volume) of the cavity 22. The inner surfaces 32, 33 are formed as solid surfaces which are not permeable by the flexible material 14 during a manufacturing process. In this way, the flexible material 14 is retained inside of the cavity 22, preferably in contact with an entirety or most of the inner surfaces 32, 33, and at least in contact with a portion of the inner surface 32.

The anchor body 16 includes a height H, an outer width OW, and an inner width IW. In the current embodiment, the outer width OW and the inner width IW are also outer and inner diameters, but are referred to as widths for the sake of simplicity when applied to other non-cylindrical anchor embodiments. In an exemplary embodiment, the shape of the anchor body 16 is configured such that it helps to promote retention of the anchor 12 to the bone and/or to the flexible material 14.

For example, the anchor body 16 preferably includes a shape in which the outer surface 30 of the sidewall 18 is tapered or otherwise angled or sloped inwardly as the sidewall 18 extends from the top opening 26 to the bottom wall 20. In other words, the sidewall 18 is tapered such that the outer width OW varies along the height H of the anchor body 16, with the outer width OW decreasing in a direction toward the bottom wall 20. This tapered structure of the outer surface 30 allows the anchor 12 to be more easily press-fit into a corresponding cavity formed in a bone. This feature helps to retain the anchor 12 to the bone.

In another example, the anchor body 16 includes a shape in which the inner surface 32 of the sidewall 18 is tapered outwardly as the sidewall 18 extends from the top opening 26 to the bottom wall 20. In other words, the sidewall 18 is tapered such that the inner width IW varies along the height H of the anchor body 17, with the inner width IW increasing in a direction toward the bottom wall 20. This tapered structure of the inner surface 32 creates an undercut which is configured to retain the flexible material 14 in the cavity 22. For example, the inner surface 32 being angled outwardly creates a shape that resists the removal of the flexible material through the top opening 26.

Figure 3B:
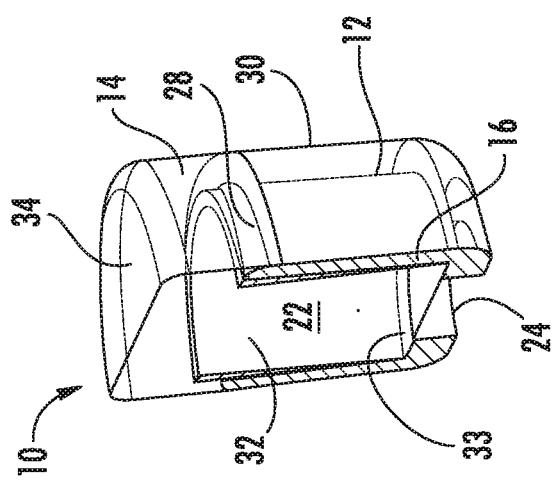
FIGS. 3A and 3B are cross-sectional views of the medical implant of FIGS. 1A and 1B.
Figure 3A:
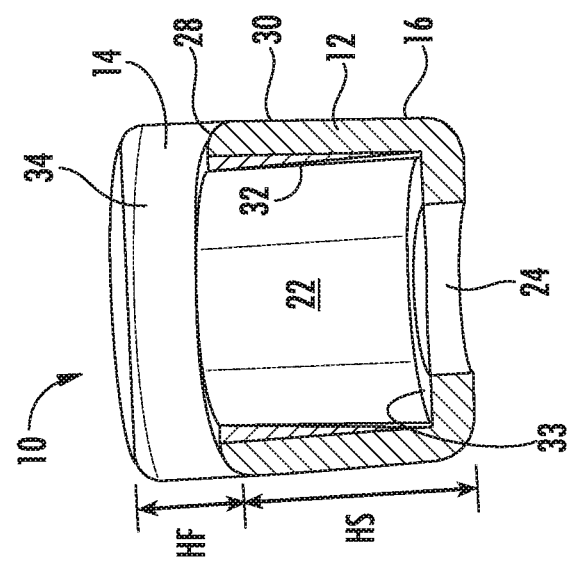

FIGS. 3A-3B illustrate a cross-sectional view of the implant 10, including the anchor 12 with at least a portion of the flexible material 14 extending out of the cavity 22 and above the upper free edge 28, preferably covering and in contact with the upper edge 28. The implant 10 defines additional parameters which include a height HS of the cavity 22 (i.e., a height of the inner surface 32) and a height HF which is defined by a distance that the flexible material 14 extends above the upper edge 28 of the anchor body 16. It can thus be seen that the total height of the flexible material 14 is equal to the sum of the height HS and the height HF. In a preferred embodiment, the height HS is greater than the height HF, as further described.

The flexible material 14 is positioned in the cavity 22 which creates a base for securely attaching to the anchor 12 and for supporting a pad 34 of the flexible material 14 which is the portion of the flexible material which is above the anchor 12 and has the height HF. The pad 34 is generally the portion of the flexible material above an upper edge 28 of the sidewall 18 which will serve as the replacement cartilage, and thus is generally sized to approximate cartilage in the area in which it is being replaced. For example, the height HF of the pad may be approximately 3-4 mm. In an exemplary embodiment, the height HS of the cavity 22 is greater than the height HF of the pad 34, thereby forming a more secure base and attachment member for the pad 34.

Figure 4C:
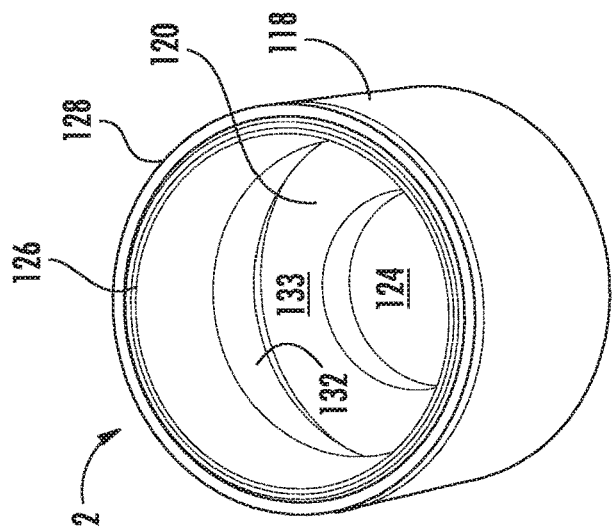
FIG. 4C is a top perspective view of the embodiment of an anchor of the medical implant of FIGS. 4A and 4B.
Figure 4B:
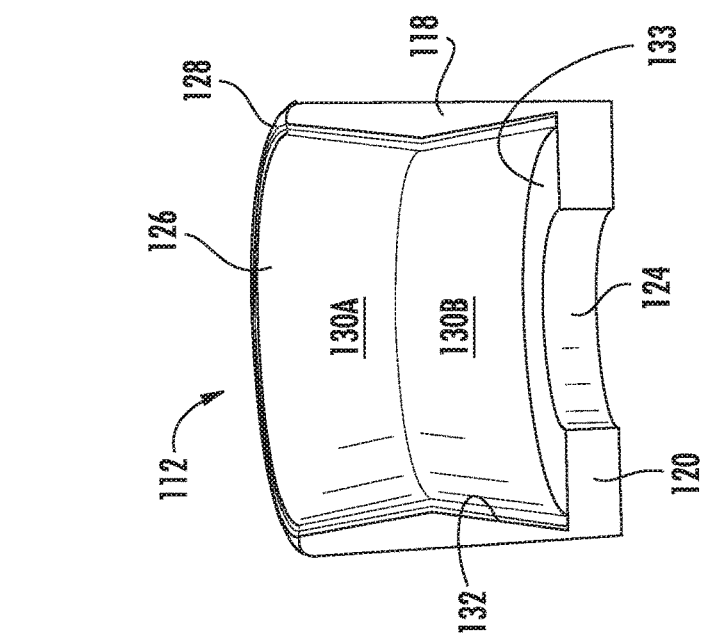
FIGS. 4A and 4B are cross-sectional views of a medical implant and anchor according to another embodiment.
Figure 4A:
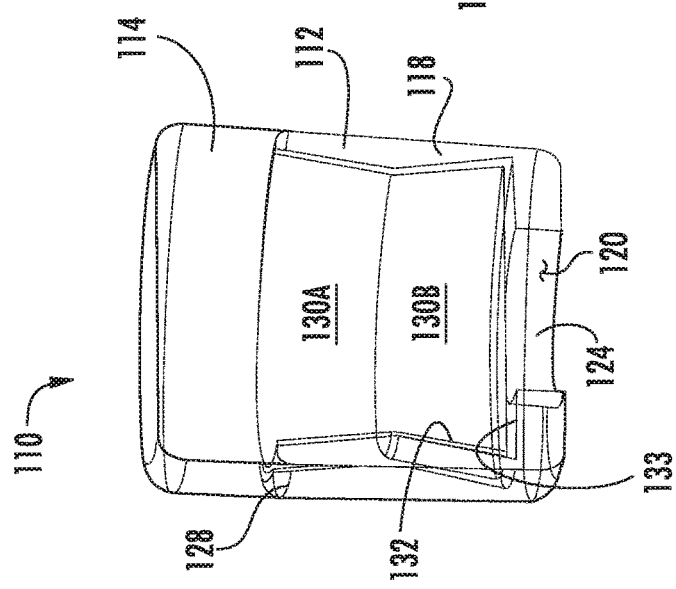

FIGS. 4A-4C illustrate an implant 110 according to another embodiment of the invention. The implant 110 is similar to the implant 10, including an anchor 112 and a flexible material 114. The anchor 112 includes a similar structure to that of the anchor 12, including a sidewall 118 and a bottom wall 120 forming a cavity 122, an aperture 124, a top opening 126, and an upper edge 128. The sidewall 118 defines an inner surface 132 and the bottom wall 120 defines an inner surface 133. However, an inner surface 132 of the sidewall 118 is different in that it defines a pair of communicating compartments 130A-B which makes up the cavity 122, which has an overall hour-glass-like shape. The upper compartment 130A is flared outward toward the top opening 26, having a wider diameter at its top and a smaller diameter as it extends toward the bottom wall 120. The lower compartment 130B includes a shape which is tapered outwardly as the sidewall 118 extends toward the bottom wall 120. This, like the sidewall 18 in the previous embodiment, creates an undercut which is configured to retain the flexible material in the cavity 122. By shifting the tapering to a bottom portion only, a greater taper angle can be achieved without significantly reducing a volume of the cavity 122 (as compared to the sidewall 18 and cavity 22 previously described). In this manner, the portion of the inner surface of the sidewall 118 between the upper and lower compartments can extend a greater distance into the interior of the anchor 112.

Layered Cylindrical Anchoring Structure

Figure 5:
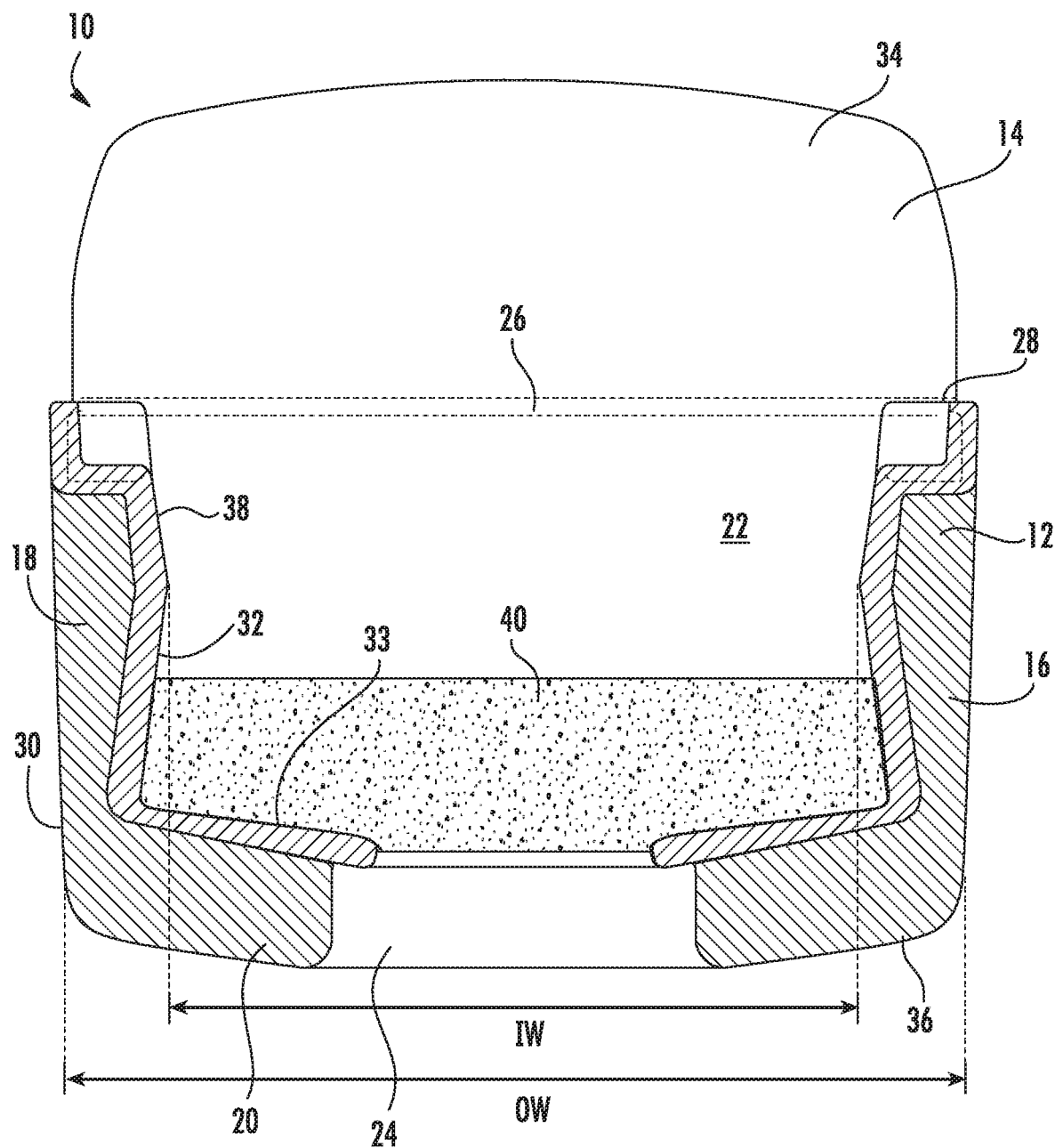
FIG. 5 is a cross-sectional illustration of an embodiment of a medical implant according to the present invention.

FIG. 5 further illustrates a cross-sectional view of an exemplary implant 10 including the anchor 12 and flexible material 14. In an exemplary embodiment, the anchor 12 is formed with a layered structure that forms the anchor body 16 and cavity 22. For example, the anchor body 16 includes a bone attachment layer 36, a barrier layer 38, and a flexible material attachment layer 40. Consistent with disclosed embodiments, the outer surface of the bone attachment layer 36 is the outer surface 30 which defines the outer width OW and the inner surface of the barrier layer 38 is the inner surface 32 which defines the inner width IW. The flexible material attachment layer 40 is in the cavity 22 with the barrier layer 38 separating the cavity 22 and flexible material attachment layer 40 from the bone attachment layer 36.

The bone attachment layer 36 includes a structure which promotes adhesion to bone. For example, the bone attachment layer 36 may include a porous structure which is similar to that of bone, such as a trabecular structure having a layer thickness of at least 0.5 mm and a pore size of about 0.15-0.5 mm. After the medical implant 10 is securely fixed to a bone, bony ingrowth and/or ongrowth occurs, securely adhering the bone attachment layer 36 to the bone. The bone attachment layer 36 forms an outer porous layer which forms at least a portion of the outer surface 30.

The barrier layer 38 is provided on an inner side of the bone attachment layer 36 and separates the bone attachment layer 36 from the flexible material 14. The barrier layer 38 may comprise a solid layer and/or may comprise a porosity having a pore size which does not permit the flow of the flexible material 14 (during manufacturing or after) through the junction to the bone attachment layer 36. In other words, the barrier layer 38 is not permeable by the flexible material 14.

The barrier layer 38 may be a separate layer or an overlap of the bone attachment layer 36 and the flexible material attachment layer 40, or an inner wall of the bone attachment layer 36 having a different permeability, which creates the junction through which the flexible material cannot flow during a manufacturing and/or assembly process. In a preferred embodiment, and as shown in FIG. 5, the barrier layer 38 makes up substantially the entire inner surfaces 32, 33 of the anchor body 16 to define the inner surface of the cavity 22. In this way, the barrier layer 38 forms a receptacle with walls impermeable to the flexible material 14 (except for, in certain embodiments, the aperture 24 and top opening 26). The barrier layer 38 may also extend along the upper edge 28 or rim of the sidewalls 18 and form a lip, ridge, or annular or surround upper wall configured to surround and engage at least a portion of the flexible material 14 at a lower end of the flexible material pad 34. The barrier layer 38 may also be formed to spread outwardly at the upper part of the layer, and extend over the upper edge 28 of the sidewall 18. It is appreciated that the bone attachment layer 36 may extend along and cover an inner rim surface of the sidewalls.

The flexible material attachment layer 40 is a porous structure positioned in the cavity 22 and which is configured to help retain the flexible material 14 within the anchor. For example, the flexible material attachment layer 40 may be a porous layer which includes pore sizes (e.g., spaces between solid materials forming the pores) which are greater than 0.4 mm. This allows the positioning, such as during a molding or pressing process, of the flexible material 14 in the cavity 22, filling the cavity 22 with the flexible material 14 and increasing the surface area contacting, engaging and supporting the flexible material such that the connection of the flexible material 14 to the anchor 12 is secure. By using a porous structure, or a lattice, web or mesh structure, a meaningful portion of the flexible material 14 is engaged providing for a secure attachment.

In an exemplary embodiment, the flexible material attachment layer 40 is connected to the barrier layer 38 and may be integrally formed as one piece. The barrier layer 38 extends up around the sides of the flexible material attachment layer (e.g., via sidewall 18). The flexible material attachment layer 40 may be positioned in contact with all or a portion of the inner surfaces 32, 33. For example, the flexible material attachment layer 40 may be connected only near a bottom of the cavity 20 and in contact with the inner surface 33 and a bottom portion of the inner surface 32. In other embodiments, the flexible material attachment layer 40 may completely or substantially fill the cavity 22. In a preferred embodiment, the flexible material attachment layer 40 extends across an entirety of the inner width of the cavity. In a preferred embodiment, the flexible material attachment layer 40 forms an entirety of the floor, base, or seat of the cavity, and has a depth selected to firmly engage and hold the flexible material 14. In some embodiments, the flexible material attachment layer 40 covers at least a portion of the inner surface of the sidewall 18, and/or at least a portion of the upper free edge 28.

The multi-layer structure provides an anchor 12 which is well-suited for attachment to both bone and the flexible material 14 which serves as the cartilage replacement layer. The container-like anchor body 16 provides a sidewall 18, which may be lined with the barrier layer 38 either in whole or in part, which acts as a retention member for forming the cavity 22 that receives a portion of the flexible material 14, securely holding the flexible material 14 therein. The inner flexible material attachment layer 40 provides an additional attachment fixation of the flexible material 14 within the anchor body 16, but may be omitted in some embodiments where it is determined that the container structure is sufficient to retain the flexible material 14.

Figure 6C:
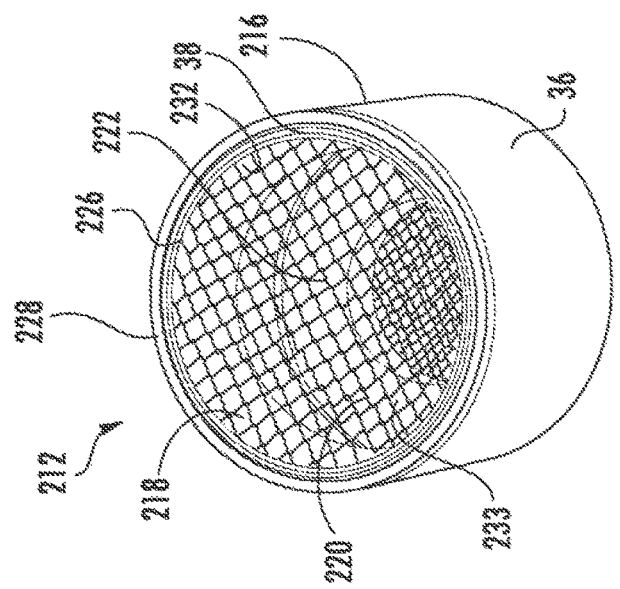
FIGS. 6A-6C are cross-sectional views of a medical implant and anchor according to another embodiment of the present invention.
Figure 6B:
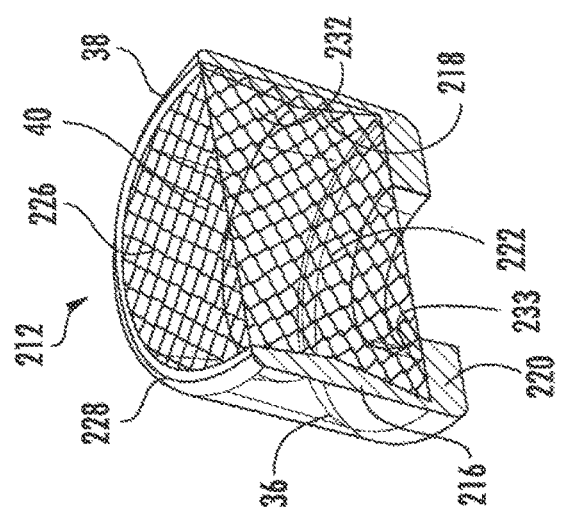
Figure 6A:
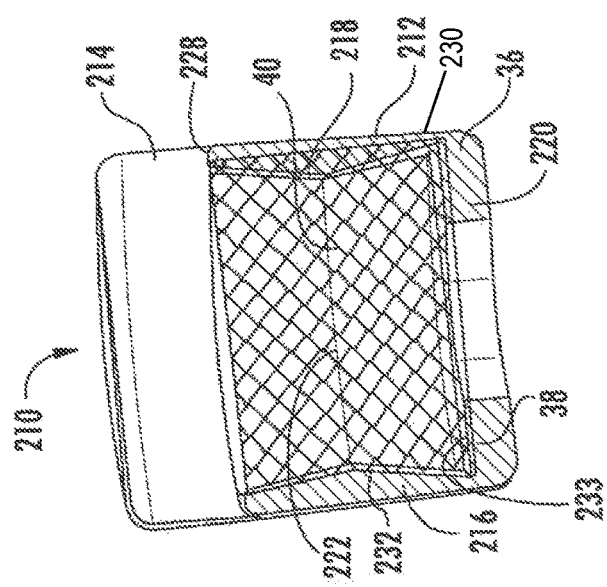

FIGS. 6A-6C further illustrate an embodiment of a medical implant 210, including a layered structure including additional means for affixing the flexible material within the implant. The implant 210 includes an anchor 212 and a flexible material 214. The anchor 212 includes an anchor body 216 which includes a bone attachment layer 36, a barrier layer 38, and flexible material attachment portion 40. The bone attachment layer 36 and barrier layer 38 (which may be integrally formed and/or be one layer) define the sidewall 218 and the bottom wall 220 which forms a cavity 222, aperture 224, top opening 226, and upper edge 228. The bone attachment layer 36 forms an outer surface 230 while the barrier layer 38 forms inner surfaces 232, 233. While the anchor body 216 is illustrated to include a cavity 222 which is divided into two compartments, it should be understood that the cavity 222 could include any shape.

The anchor 212 further includes the flexible material attachment portion 40, formed as a lattice, mesh-like or web-like structure positioned in the cavity 222. The lattice structure may be formed as a cross-strut configuration, but it should be understood that the lattice structure is representative of any porous portion, structure or layer, which may be mesh-like or web-like, which allows the flexible material 214 to be positioned throughout the cavity 222, and which also adds additional surface area, support and increased retaining surfaces which help to retain the flexible material 214 in the anchor 212. The flexible material attachment layer 40 extends all the way across the inner width of the cavity 222 (i.e., covering the entire inner surface 233 of the bottom wall 220), filling substantially all of the cavity 222.

The medical implant 10 (or 110 or 210) can be delivered into a joint through a minimal incision. Once delivered, the implant can be installed with secure, stable fixation of the bone anchor to rigid bone tissues at the implant recipient site and thereby securing the flexible bearing surface to the bone, such as to supplement or replace damaged cartilage. The extension of the flexible material 14 into the cavity 22 of the hollow anchor 12 provides a secure grip of the anchor 12 to the flexible material 14. The anchor 14 is fixed rigidly to bone (e.g., through press-fit and bony ingrowth) and thereby fixes the cartilage-like flexible material 14 rigidly to bone.

In order to produce the medical implant 10 (or 110 or 210), a molding process may be implemented, such as injection molding. During molding, the flexible material 14 flows and fills the cavity 22 while within the mold. This molding process of the flexible material 14 onto and within the anchor 12 results in the permanent fixation of the flexible material 14 to the hollow anchor 12. The flexible material attachment portion 40 also helps to retain the flexible material 14 by allowing the flow of the flexible material 14 into the relatively large pores, creating an entrapping lattice which has surface area adhesion and friction which prevents the solidified flexible material 14 from being removed.

Figure 7A:
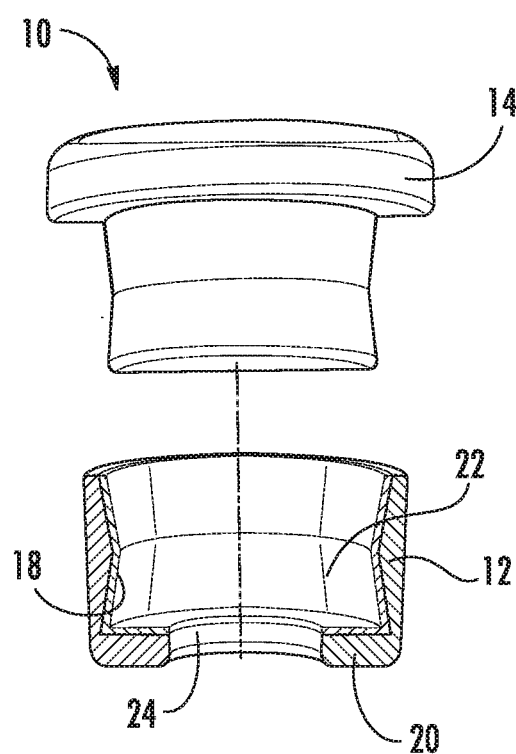
FIGS. 7A and 7B are cross-sectional views illustrating an assembly configuration of a medical implant according to the present invention.
Figure 7B:
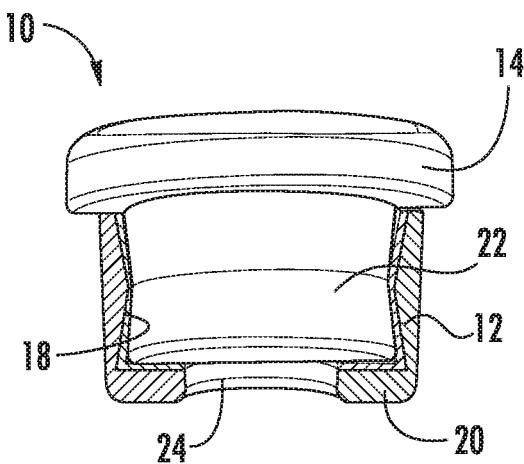

FIGS. 7A-7B illustrate an alternative method of manufacturing and/or assembly in which the flexible material 14 is formed as a plug which is insertable into and removable from the anchor 12, such as by a press, friction or "snap" fit. The flexible material 14 is interference fit within the cavity 22 of the anchor body 16 and removable therefrom. The undercut created by the tapered sidewall 18 retains the flexible material 14 until a threshold removal force is reached, at which point the flexible material overcomes the retaining force and is removed from the cavity 22 of the anchor 12. The flexible material 14 may similarly be attached to the anchor 12 by applying a sufficient insertion/pressure force, and may be press-fit into the cavity 22, or otherwise be inserted for an interference fit.

The embodiment of FIGS. 7A-7B provides a modular system in which an anchor 12 may be implanted in a bone of an organism to form a site for receiving a flexible material plug or pad which will be used as the replacement cartilage. If the flexible material 14 should become damaged, worn or otherwise no longer be viable, it could be removed from the anchor 12 and a new plug or pad installed therein. In this manner, the anchor can remain in place for receiving a new plug or pad of material to replace the cartilage.

Flexible Material Pad

FIGS. 8A-8D further illustrate another embodiment of a medical implant 310. In medical implant 310, a plurality of anchors 312 are used in combination with a pad 350 of flexible material 314. The anchors 312 may be any of anchors 12, 112, or 212 or any other anchor consistent with this disclosure.

Figure 8A:
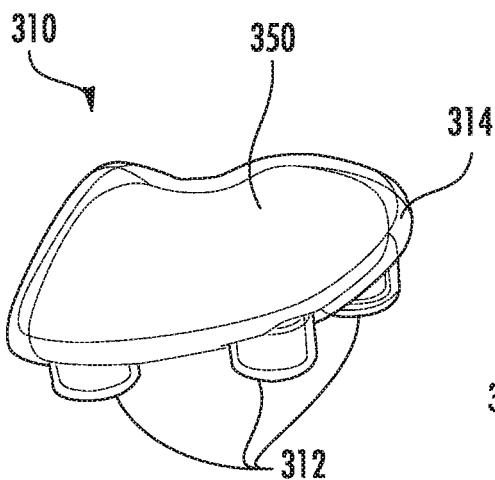
FIGS. 8A-8D are perspective views of an exemplary medical implant utilizing multiple anchors, according to an embodiment of the present invention.
Figure 8B:
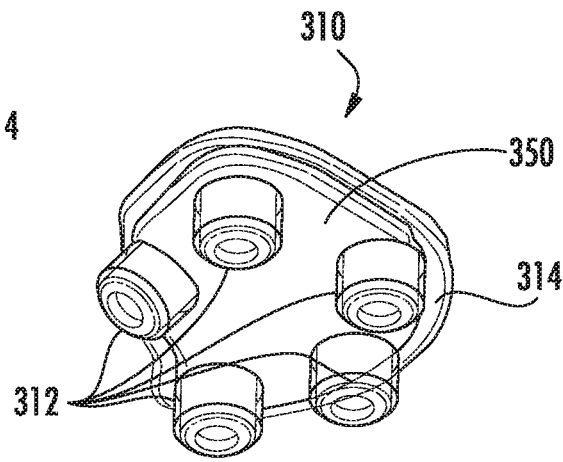
Figure 8C:
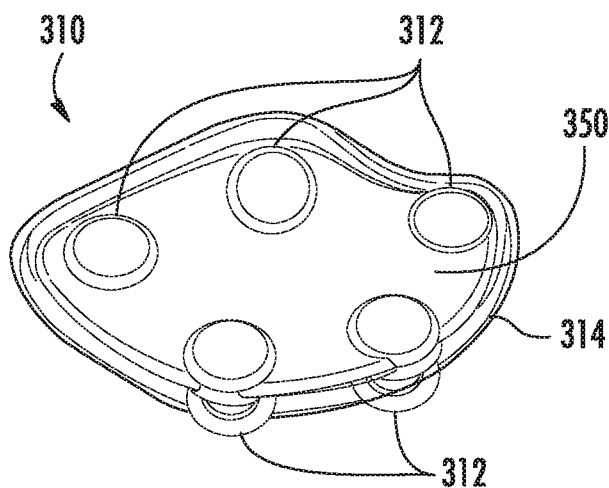
Figure 8D:
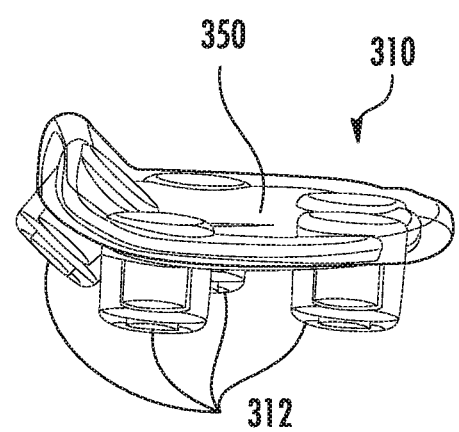
Figure 8E:
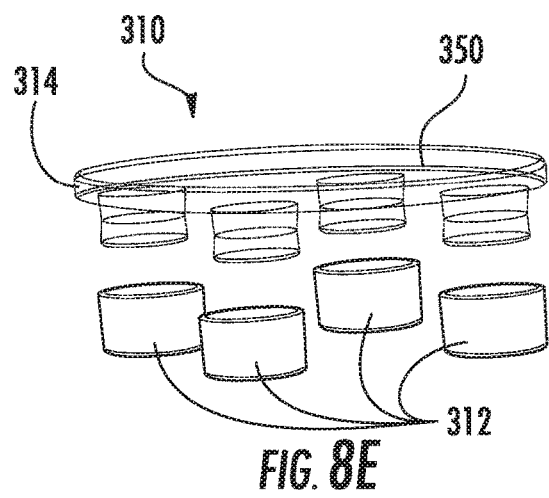
FIGS. 8E-8H are perspective views illustrating an assembly configuration of the a medical implant utilizing multiple anchors according to the present invention.
Figure 8F:
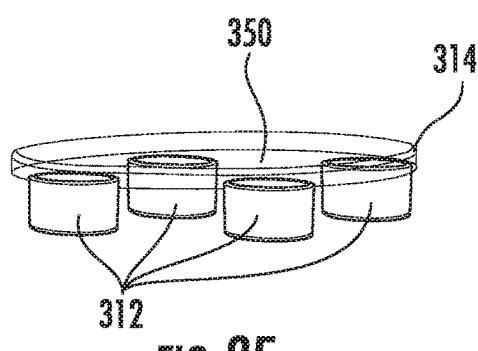
Figure 8G:
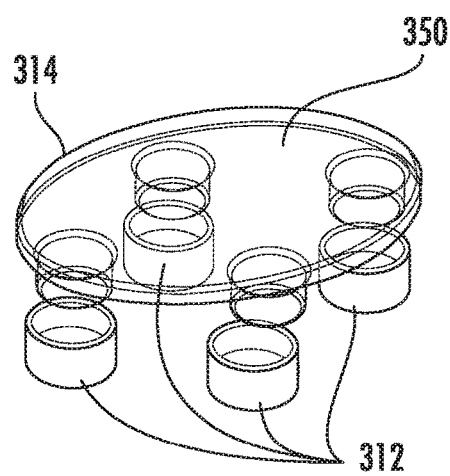
Figure 8H:
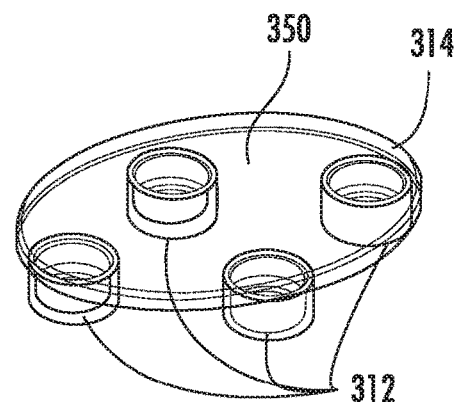

The pad 350 is formed with a bottom surface which covers the plurality of anchors 312. In an exemplary embodiment, portions of the pad 350 traverse gaps between the anchors 312. The anchors 312 may be each implanted at different locations on a bone and the pad 350 formed to be a replacement cartilage surface for that bone. The implant 310 may be formed through injection molding, with the anchors 312 positioned to receive the flexible material 314 in a selected orientation and a cavity in the shape of the pad 350 formed above the anchors for created the cartilage replacement surface. As best seen in FIG. 8D, at least two of the anchors 312 extend in non-parallel directions. For example, at least two of the plurality of anchor top openings are in non-parallel planes. In this way, the pad 350 can be made to curve around the bone at the site of the joint.

In another embodiment, as illustrated in FIGS. 8E-8H the implant 310 may be constructed such that the pad 350 is removable from the anchors 312. In this way, the anchors 312 may be separately implanted into appropriate locations in a bone site and then the pad 350 installed by pressing flexible material projections 316 into respective cavities 322 of the anchors 312.

FIGS. 9A-9G illustrate an exemplary implementation of the disclosed embodiments, including medical implants 410A, 410B which are used to replace a cartilage interface in a knee joint, such as that between a femur F and a tibia T. The implant 410A includes a plurality of anchors 412A which are implanted in the tibia T at strategically placed locations such that a pad 450A for creating the cartilage replacement surface is positioned on an appropriate surface of the tibia T. Similarly, the implant 410B includes a plurality of anchors 412B which are implanted in the femur F at various strategic locations such that a pad 450B for creating the cartilage replacement surface is positioned on an appropriate surface of the femur F.

The implants 410A, 410B form cartilage replacement devices which may be rolled up and surgically installed using only a small incision. Moreover, the configuration of the flexible material pads 450A, 450B and the anchors 412A, 412B allow for secure connection of the cartilage replacement surface to bones, including bone surfaces which may include complicated curvatures and shapes, such as those shown with respect to the tibia T and femur F.

Anchor Formation

The anchors such as anchors 12 are preferably made from a medical-grade implant material such as titanium, titanium alloy, or other metal. In an exemplary embodiment, the anchors 12 may be formed through a 3-D printing process. This process includes, for example, metal laser sintering or electronic beam focused additive manufacturing technologies. 3-D printing allows for precise and accurate formation of components, such as the disclosed anchors, using selected materials formed to selected specifications. For example, 3-D printing techniques allow an anchor which includes the disclosed multi-layer structure to be integrally formed as one piece.

Figure 10C:
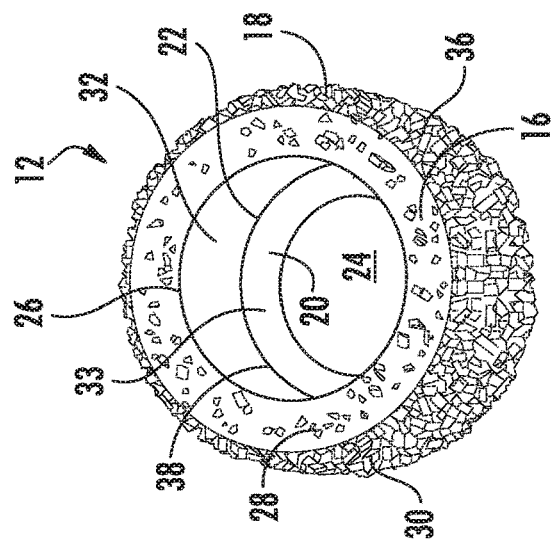
FIGS. 10A-10C are perspective views of an anchor showing a layered structure according to an embodiment of the present invention.
Figure 10B:
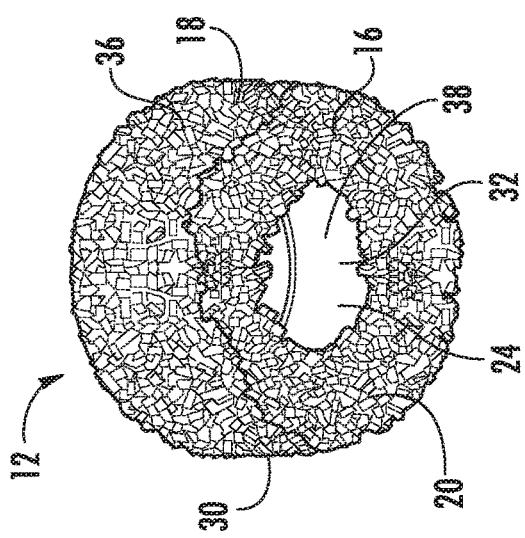
Figure 10A:
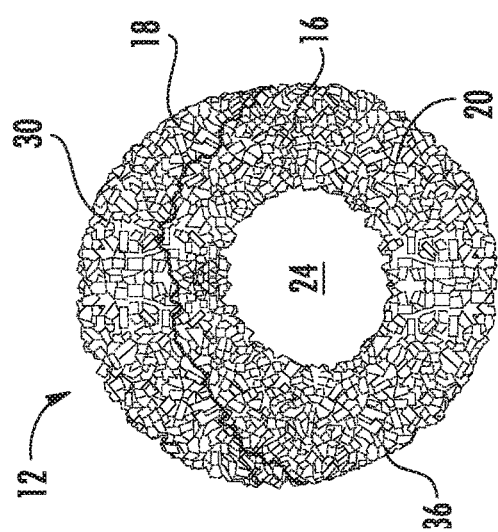

FIGS. 10A-10C and 11A-11C are exemplary illustrations of anchors such as produced through 3-D printing. FIGS. 10A-10C include the anchors 12, having the anchor body 16, sidewall 18, and bottom wall 20. The 3-D printing process produces the anchor body 16 having a bone attachment layer 36 which includes a selected pore size for promoting secure fixation to bone. The 3-D printing process is further capable of forming the anchor body 16 with a barrier layer 38 formed at the inner surfaces 32, 33 of the sidewall 18 and bottom wall 20 which prevents the flexible material 14 from flowing through to the bone attachment layer 36. In an exemplary embodiment, the barrier layer 38 makes up all or substantially all of the inner surfaces 32, 33 such that the cavity 22 is formed as a receptacle for receiving and retaining the flexible material 14. The upper edge 28 may be formed as a denser or smoother region.

The bone attachment layer 36 is modeled and formed as a trabecular structure which includes interconnected and angled surfaces which form the porous construction of the bone attachment layer 36. The 3-D printing process can overlay a solid barrier layer 38 at the inner surface 32 of the sidewall 18 and/or continue with the same type of trabecular structure only with a smaller pore size which does not allow the flexible material 14 to pass therethrough. Thus, the barrier layer 38 is different in its arrangement, structure or formation of materials as compared to the bone attachment layer 36.

FIGS. 11A-11C include the anchors 212 modeled or produced via 3-D printing. The anchor 212 includes the multi-layer structure as detailed herein, including the bone attachment layer 36, the barrier layer 38, and the flexible material attachment portion 40. The bone attachment layer 36 and barrier layer 38 are the same or similar to those described in relation to FIGS. 10A-10C. For example, the barrier layer 38 forms the cavity 222 which receives and is impermeable to the flexible material.

The flexible material attachment portion 40, which may also be considered a flexible material attachment layer, is formed as a lattice structure (and may be a mesh-like or web-like structure), which creates a porous layer that may be formed through the 3-D printing process. The flexible material attachment portion 40 includes a pore or opening size which allows the flexible material to flow through and fill the cavity 222 formed by the sidewall 218. For example, the flexible material attachment portion 40 includes a pore size of at least 0.4 mm. The flexible material attachment portion 40 may be positioned anywhere in the cavity 222, including substantially filling the cavity 222.

The anchors produced via 3-D printing may include the layered structure, which may be made to overlap with each other at the barrier layer. For example, layers (e.g., bone attachment layer 36 and barrier layer 38 on one side and/or the flexible material attachment portion 40 and barrier layer 38 on the other side) may be formed to overlap by about 0.1-0.2 mm so that the 3-D printing produces solidly adherent layers. The solid barrier layer 36 may be made to be approximately 0.2-2 mm thick, thus producing a layer which adheres the two porous layers to each other and prevents the passage of material therethrough.

Combined Implant Structure

Figure 12:
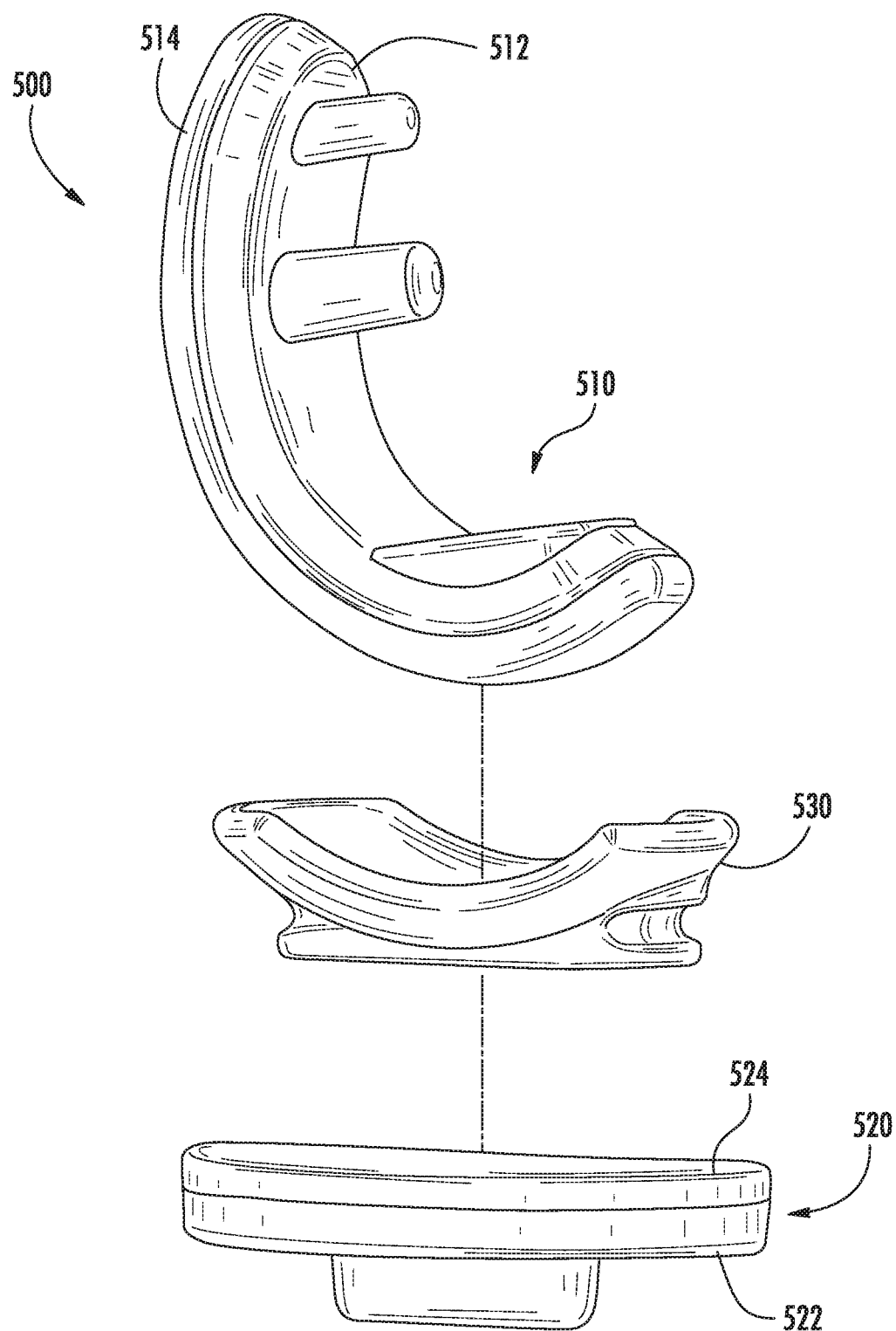
FIG. 12 is an exploded view of a medical implant system, consistent with disclosed embodiments.

It should be understood that the disclosed concepts may be utilized in other manners which produce a structural device for implanting in a human or animal and anchoring a flexible material to bone. For example, a combined implant structure is also contemplated which produces a system for a larger scale repair and/or replacement of cartilage in a joint. FIG. 12 illustrates an example of an implant system 500 which includes features that may be used separately or in combination to repair, for example, the cartilage of a knee joint.

The implant system 500 includes a femur implant 510, a tibia implant 520, and an optional receptacle pad 530. The femur implant 510 and tibia implant 520 are configured to be surgically implanted in a femur and tibia, respectively, in order to resurface those bones with a cartilage-like material in the area of the knee joint. The optional receptacle pad 530 may be flexible material insert which provides a cupped surface for receiving and maintaining the femur implant 510. It should be understood, however, that the receptacle pad 530 may be omitted and only the femur implant 510 and tibia implant 520 used, just as only one of the femur implant 510 or tibia implant 520 may be implanted during a surgical procedure. The receptacle pad 520 forms a curved seat for receiving the corresponding curved shape of the femur implant 510.

Figure 13A:
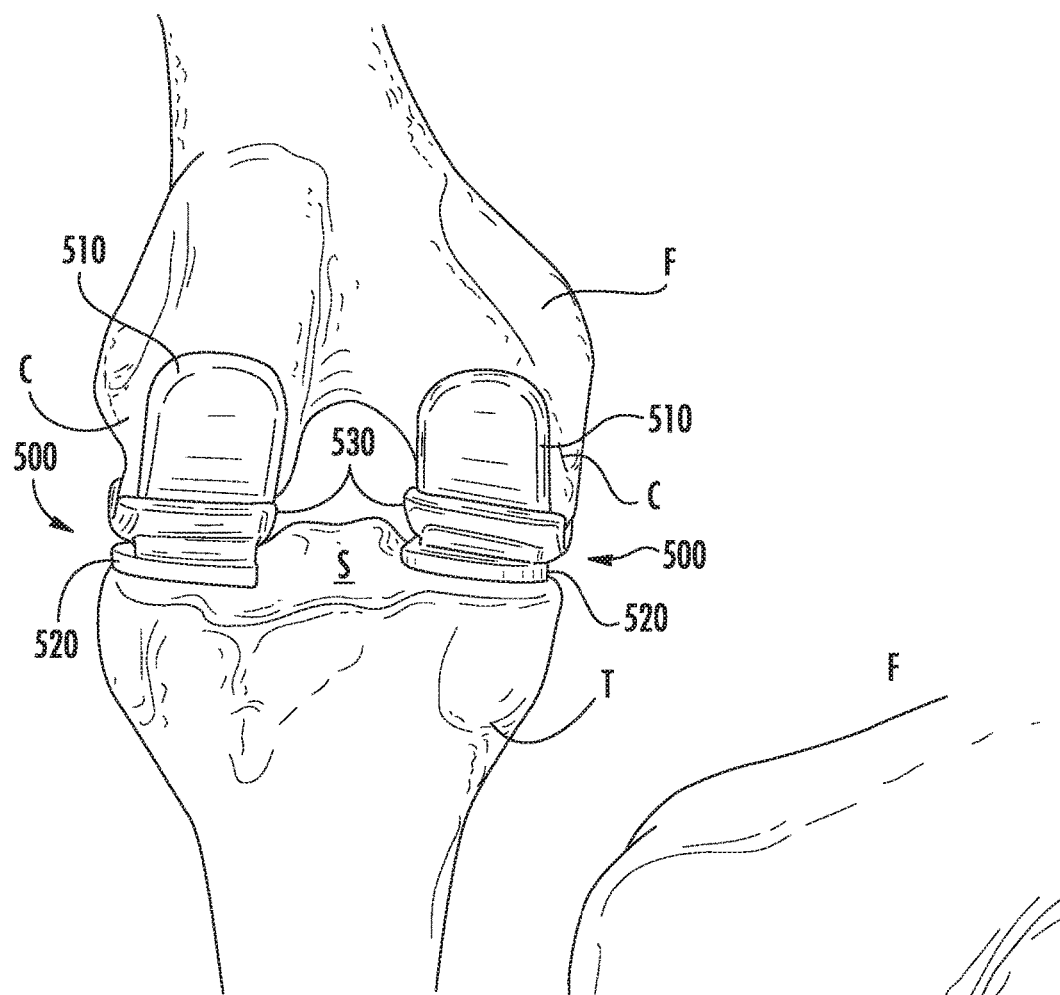
FIGS. 13A and 13B illustrate a knee joint including the medical implant system of FIG. 12.
Figure 13B:
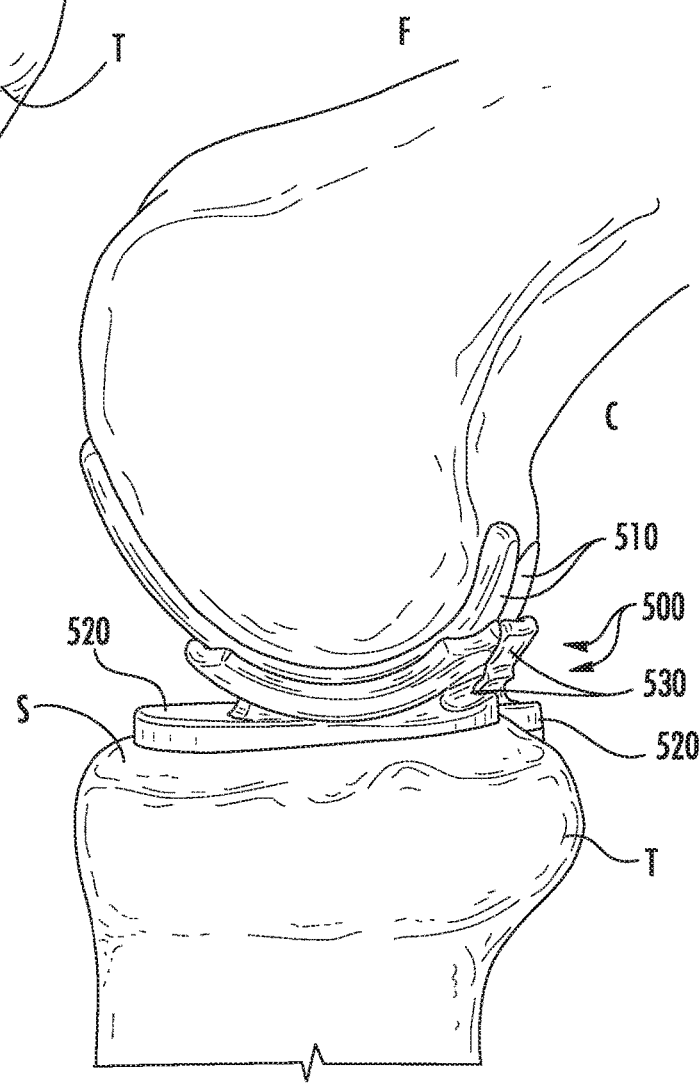

FIGS. 13A-13B further illustrates the implant system 500 in combination with a knee joint between a femur F and a tibia T. The femur implant 510 is preferably curved to match the shape of a condyle C at the end of the femur bone F. In an exemplary embodiment, the femur implant 510 has essentially an overall C-shape. More generally, the femur implant 510 (or other implants consistent with disclosed embodiments) includes an irregular shape for being implanted in a condyle C at the end of a bone forming a portion of the anatomy of a mammalian synovial joint. The tibia implant 520 includes a shape corresponding to a relatively flat upper surface S of the tibia bone T. The tibia implant 520 has a general overall semi-circular shape when viewed from above. Moreover, it can be seen that both the femur implant 510 and the tibia implant 520 include a portion which is implanted into the actual bone such that all or a majority of the material of the implants that are outside of the bone is flexible material forming the cartilage-like surface replacement. As further shown in FIG. 13, both articulating sides of the knee joint may be resurfaced and repaired using separate implant systems 500.

Both the femur implant 510 and the tibia implant 520 incorporate at least some of the features of the other implants discussed herein (e.g., implant 10). For example, each of the femur implant 510 and tibia implant include an anchoring system configured to provide an anchor to bone on a first side, and to further attach a flexible material for cartilage replacement on a second side. The anchoring systems comprise a cavity or receptacle configured to engage the flexible material, as described herein.

As shown in FIG. 12, it can be seen that the femur implant 510 includes an anchor 512 and a flexible material pad 514. Similarly, the tibia implant 520 includes an anchor 522 and a flexible material pad 524. Like the previous embodiments, the anchors 512, 522 are formed to help facilitate the secure connection of the flexible material pads 514, 524 to the bones and vice versa. In addition, the anchors 512, 522 include cavity portions which are filled by a portion of the flexible material pads 514, 524 in order to produce a supporting base and fixed attachment structure.

Figure 14A:
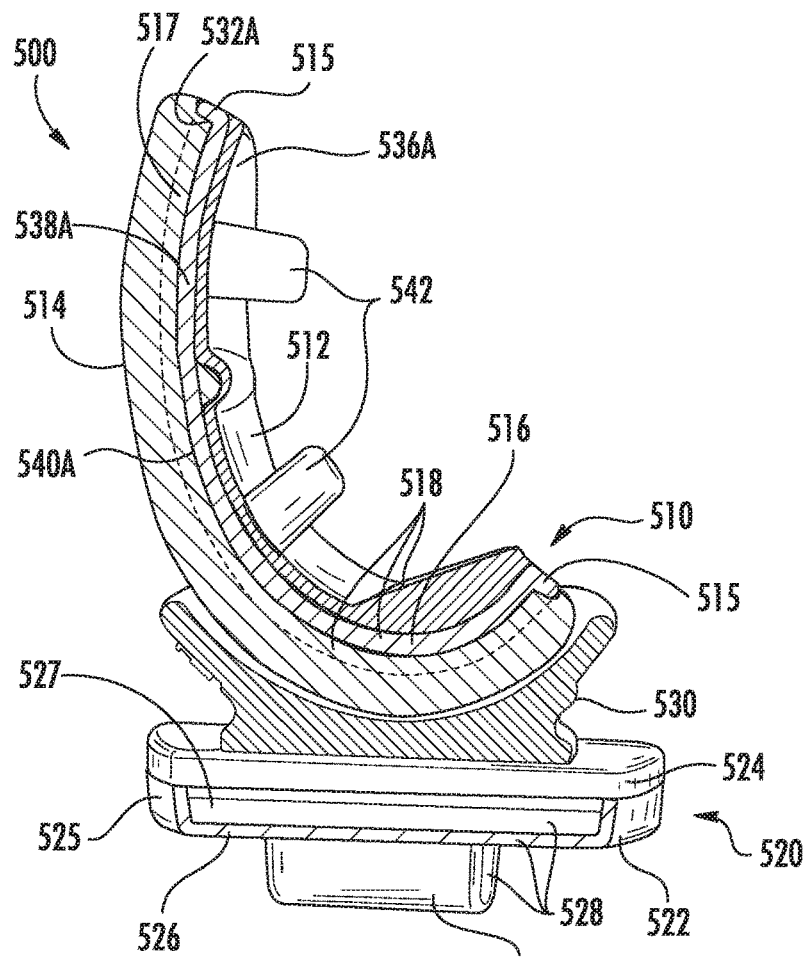
FIGS. 14A and 14B are cross-sectional views of the medical implant system of FIG. 12.
Figure 14B:
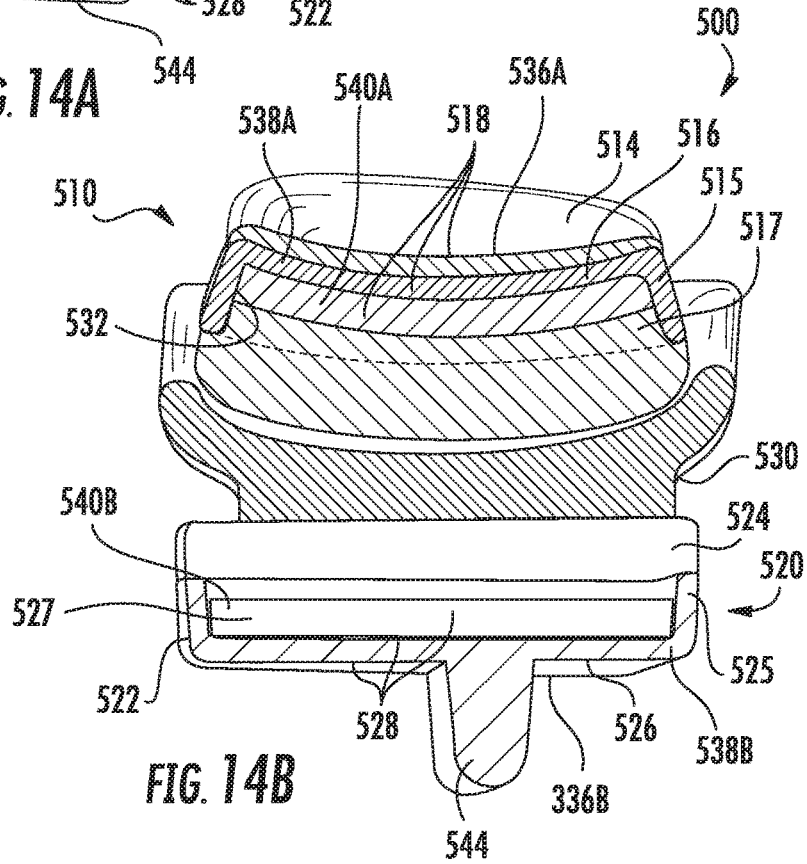
Figure 15A:
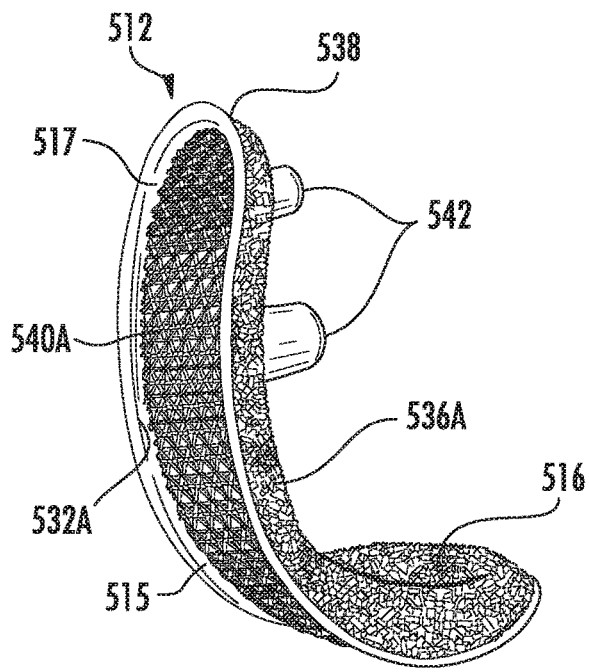
FIGS. 15A-15D are perspective views of an anchor for a femur implant of the medical implant according to an embodiment of the present invention.
Figure 15B:
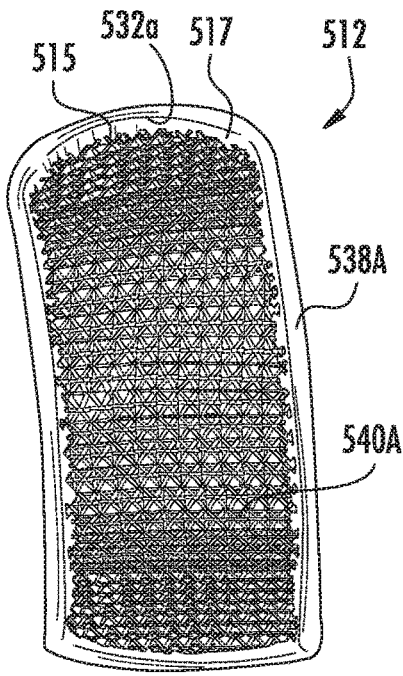
Figure 15C:
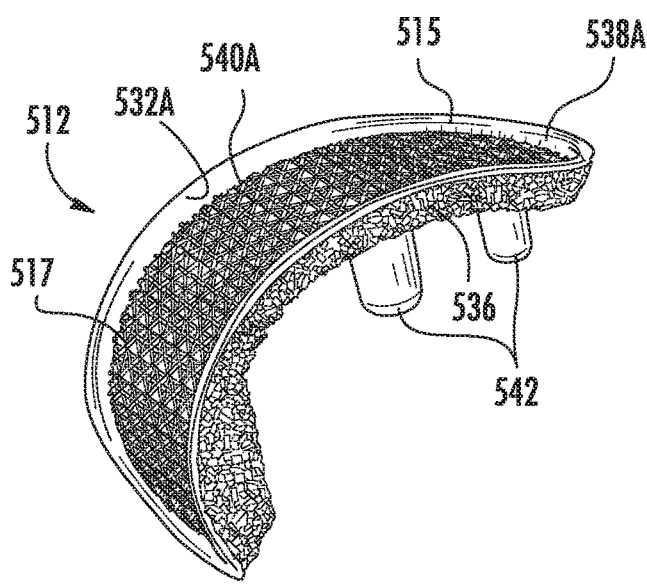
Figure 15D:
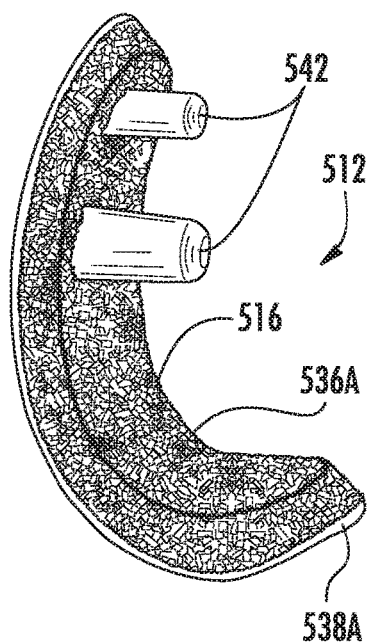
Figure 16A:
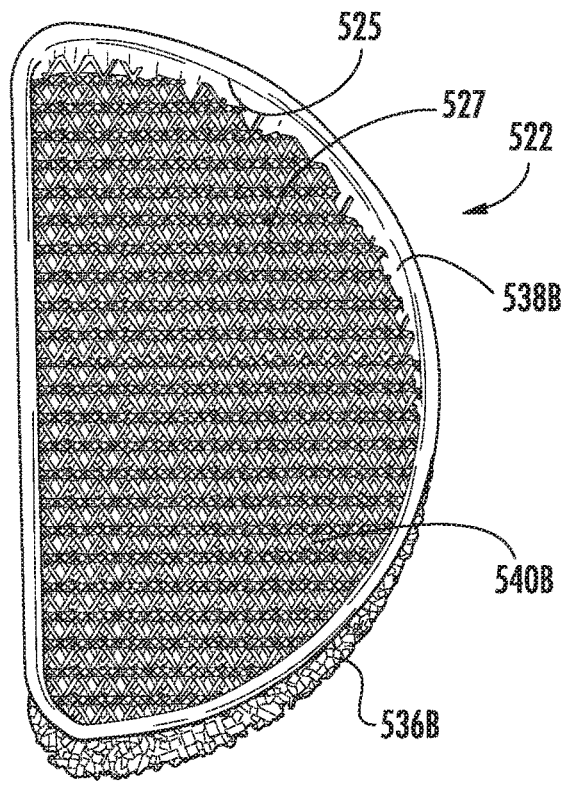
FIGS. 16A-16E are perspective views of an anchor for a tibia implant of the medical implant system according to an embodiment of the present invention.
Figure 16B:
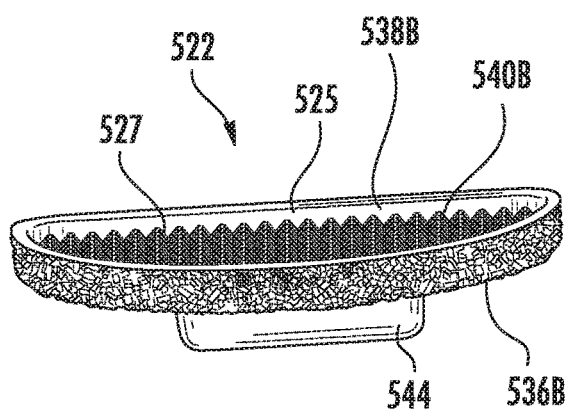
Figure 16C:
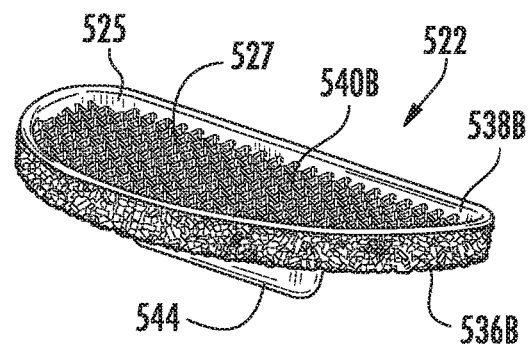
Figure 16D:
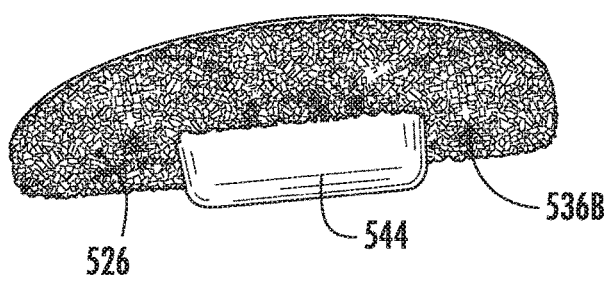
Figure 16E:
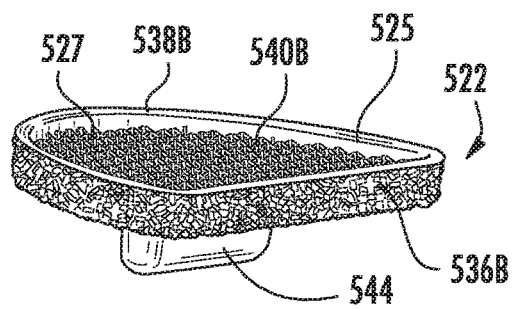
Figures 17A, 17B, 17C, 17D:
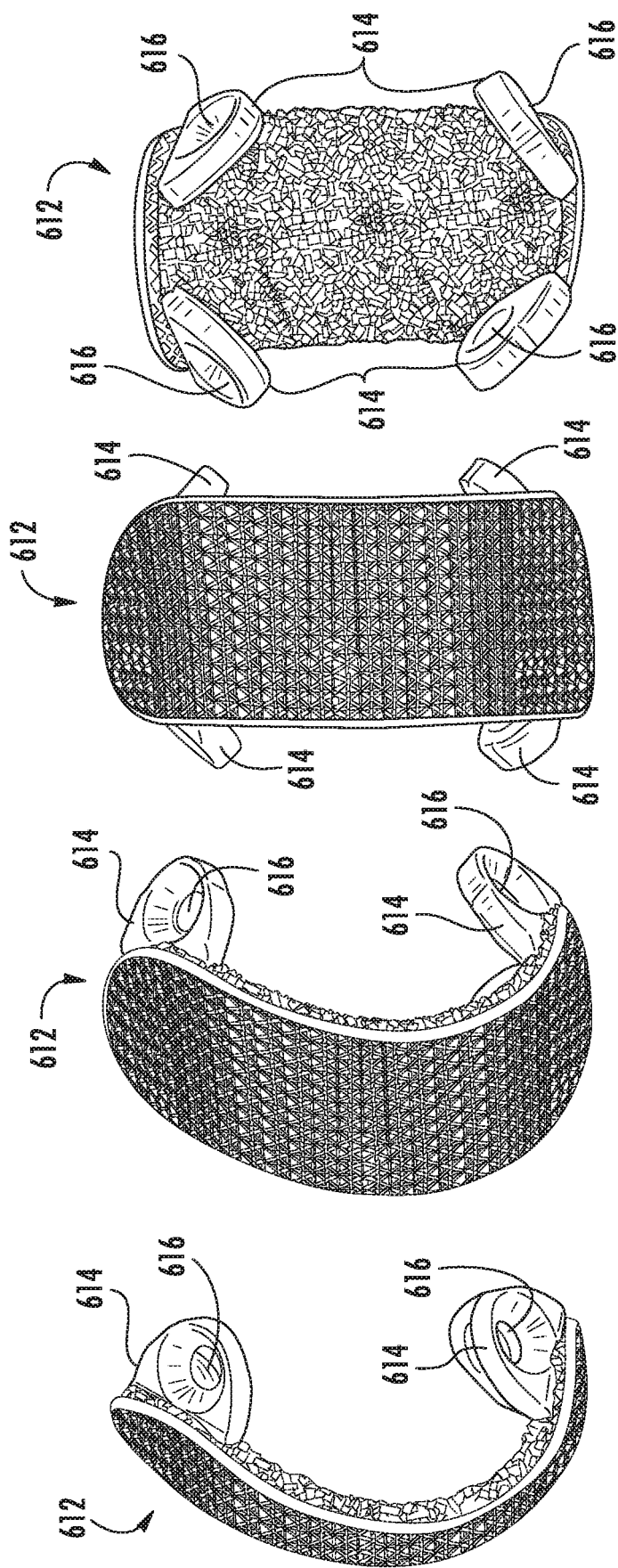
FIGS. 17A-17D are perspective views of an anchor for a femur implant according to an embodiment of the present invention.

FIGS. 14A and 14B are cross-sectional views of the implant system 500, including the femur implant 510, tibia implant 520, and mobile receptacle pad 530. As shown, the anchor 512 of the femur implant 510 includes a sidewall 515 and a bottom wall 516. The sidewall 515 and bottom wall 516 define a cavity 517 for receiving a portion of the flexible material pad 514. For example, inner surfaces of the sidewall 515 and bottom wall 516 define the cavity 517. The cavity 517 has a depth which is approximately equal to a height of the inner surface of the sidewall 515. The cavity 517 acts as a recess for receiving a flexible material acting as a cartilage replacement. The sidewall 515 is thus formed as a wall, lip, ridge, rim, or the like which creates the cavity 222 and allows for lateral support and attachment of the flexible material pad 514. The anchor 512 further includes a plurality of layers 518 which make up the sidewall 515 and bottom wall 516.

The layers 518 form the multi-layered structures described herein which have a construction similar to other embodiments described herein. For example, the layers 518 preferably include a bone attachment layer 536A, a barrier layer 538A, and a flexible material attachment layer 540A. The layers 518 are consistent with the disclosure in that the bone attachment layer 536A is a porous structure which is in contact with or implanted into bone and promotes bony ingrowth and/or ongrowth of bone into the pores of the structure, the barrier layer 538A prevents the passage of flexible material into the bone attachment layer 536A or bone itself while creating a secure attachment to the flexible material attachment layer 540A, and the flexible material attachment layer 540A itself also including a porous structure which helps to retain the flexible material pad 514.

The bone attachment layer 536A may include a porous structure which is similar to that of bone, such as a trabecular structure having a layer thickness of at least 0.5 mm and a pore size of about 0.15-0.5 mm. After the femur implant 510 is placed adjacent or into a bone (e.g., in an implant cavity formed in the femur F), bony ingrowth occurs, securely adhering the bone attachment layer 536A to the bone. In addition, the bone attachment layer 536A (and/or underlying barrier layer 538A) may include one or more projections 542 which further enter into the bone and help to connect the anchor 512 to the bone. For example, the projections 542, like the anchors 12, may include a tapered outer surface which is press-fit into a corresponding opening formed in the bone.

The barrier layer 538A is attached on an inner side of the bone attachment layer 536A and forms a solid or minimally-porous inner surface 532A of the sidewall 515. The inner surface 532A of the barrier layer defines the cavity 517 into which the material of the flexible material pad 514 is injected or inserted. The impermeable structure of the inner surface 532A prevents the flow of the flexible material to the bone attachment layer 536A. Moreover, the barrier layer 538A acts a binder to hold the two porous 536A, 540A layers together during the 3-D printing process, as well as in the final functional product.

The flexible material attachment layer 540A is positioned in the cavity 517, which may also be thought of as a base, seat and/or receiving area, and includes a porous structure which allows for the positioning, molding and retention of the flexible material and creates additional retention spaces and surface area for helping to retain the flexible material pad 514 to the anchor 510 and thus to the femur bone F. For example, the flexible material attachment layer 540A may include a porous structure with a pore size of at least 0.4 mm, which allows the passage of a hydrogel material prior to solidification. In a preferred embodiment, the flexible material attachment layer 540A comprises substantially the entirety of the bottom or floor of the cavity 517, providing a surface area at the bottom of the cavity for secure affixation of a flexible material. Thus, the flexible material pad 514 is essentially entirely supported at its lower portion from beneath by the flexible material attachment layer 540A, and the flexible material positioned into, such as pressed into during a molding process, the pores of the flexible material attachment layer 540A.

The anchor 522 of the tibia implant 520 is similarly constructed to fixedly attach the flexible material pad 524 to the tibia bone T. The anchor 522 includes a sidewall 525 and a bottom wall 526 which define a cavity 527 for receiving a portion of the flexible material pad 524. Like the anchor 512, the anchor 524 includes a plurality of layers 528 which make up the sidewall 525 and bottom wall 526.

The layers 528 also form a multi-layer structure including a bone attachment layer 536B, barrier layer 538B, and a flexible material attachment layer 540B. These layers 528 are consistent with the similarly-described layers of the femur implant 510 and promote the fixed attachment of flexible material pad 524 to the tibia bone T through porous layers 536B and 540B which sandwich a solid or minimally-porous barrier layer 538B which prevents the flow of flexible material through the joint during a manufacturing process and thereafter. The bone attachment layer 536B and/or barrier layer 538B may further include a projection 544 which extends further into the bone and which may be configured to help retain the anchor 522 to the bone (e.g., via tapered surfaces and a press-fit into a corresponding opening).

FIGS. 15A-15D further illustrate exemplary embodiments of the anchor 512 of the femur implant 510. As described herein with respect to other disclosed anchors, the anchor 512 may be fabricated using a 3-D printing process. The 3-D printing process may produce the 3-layered structure of the anchor 512, including the bone attachment layer 536A, the barrier layer 538A, and the flexible material attachment layer 540A.

As shown in FIGS. 15A-15D, the anchor 512 defines the cavity 517 which receives and is substantially filled by the flexible material attachment layer 540A. The cavity 517 is preferably formed with walls of the barrier layer 538A surrounding the cavity 517 thus creating a receiving trough or receptacle capable of holding the flexible material therein during a manufacturing process and thereafter. The sidewall 515 creates a ridge, lip, wall, or the like which provides lateral support which helps to retain the flexible material pad 514. The walls thus extend a barrier layer at a height above or beyond the flexible material attachment layer 540A.

The projections 542 are formed to extend from the underside of the cavity 517, and may be formed as part of the barrier layer 538A, the bone attachment layer 536A, or a combination thereof. The structure of the projections 542 may be determined during a 3-D printing process, for example, and the density, porosity or other attributes may be selected for proper use. The projections may be positioned at an upper portion, as oriented in the Figures, of the femur implant 510 to securely attach an uppermost portion of the anchor 512 to the femur F. The projections 542 may include one or more spaced projections which may be cylindrical in shape, but are not limited to a specific shape.

FIGS. 16A-16E similarly further illustrate an exemplary embodiment of the anchor 522 of the tibia implant 520. The anchor 522 also may be 3-D printed to produce the bone attachment layer 536B, barrier layer 538B, and flexible material attachment layer 540B.

The walls 525 of the barrier layer 538B surrounds the cavity 527 which is formed as a receiving trough or receptacle capable of holding the flexible material therein during a manufacturing process and thereafter. The sidewall 525 creates a ridge, lip, wall, or the like which provides lateral support which helps to retain the flexible material pad 524.

The bone attachment layers 536A, 536B may be 3-D printed to include a trabecular structure throughout with a layer thickness of at least 0.5 mm and a pore size of about 0.15-0.5 mm. The barrier layers 538A, 538B may be formed as non-porous material layers that are overlaid on inner sides of the bone attachment layers 536A, 536B, respectively. The barrier layers 538A, 538B form cavities 517, 527 respectively which are container sections for being filled by the flexible material (e.g., through molding and/or interference fit). The flexible material attachment layers 540A, 540B are porous structures formed in these embodiments as cross-mesh lattices which include pores that allow the passage or flow of the flexible material therethrough. The flexible material attachment layers 540A preferably comprises substantially the entire floor of the cavity 527, providing an increased surface area for engagement and support of the lower portion of the flexible material received within the cavity.

The implant system 500 combines the sidewall and cavity structure and multi-layer features of the other embodiments discussed herein to provide specifically-tailored implants which allow for the resurfacing and repair of one or more cartilage surfaces that are present in a joint, such as a knee joint. It should be understood that these concepts may be similarly combined to produce other shapes and sizes of implantable anchors for securely applying a cartilage-like surface to other joints and bones.

Alternative Structures and Features

It should be understood that the systems, components and methods described herein are exemplary and that the disclosed features may be implemented in numerous ways in order to produce an implant structure consistent with disclosed embodiments. For example, while 3-D printing is described herein as an advantageous method for producing the disclosed anchors, it should be understood that alternative methods, such as machining, molding, etc., may be used either separate or in combination with 3-D printing to produce an anchor with the disclosed features for securing a flexible material to a bone.

In another example, alternative means for fastening an anchor to a bone may be used. For example, mechanical fasteners may be used in place of or in addition to the press-fit means described herein. FIGS. 17A-17D illustrate an anchor 612 which includes the features of the anchor 512 of the femur implant 510, but additionally includes securing tabs 614 which have apertures 616. The securing tabs 614 are positioned over bony structure and bone screws are inserted through the apertures 616 to attach the anchor 612 to a bone (e.g., femur F).

Figure 19A:
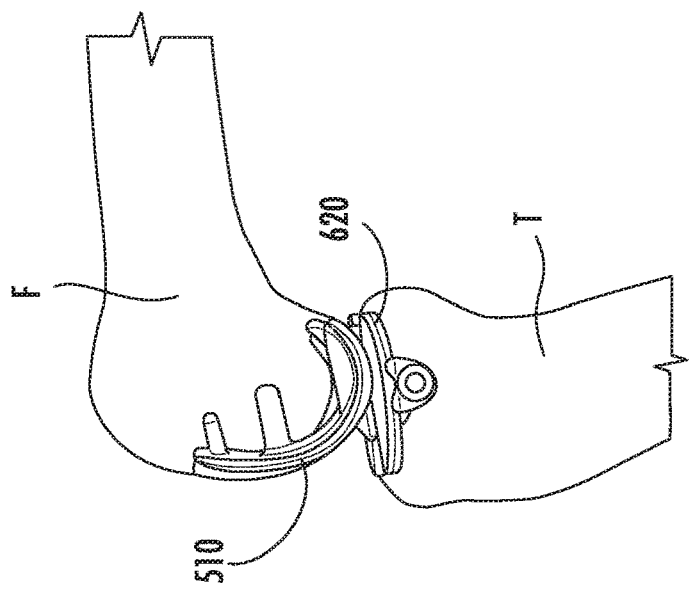
FIGS. 19A-19C illustrate a knee joint including an alternative medical implant system.
Figure 19B:
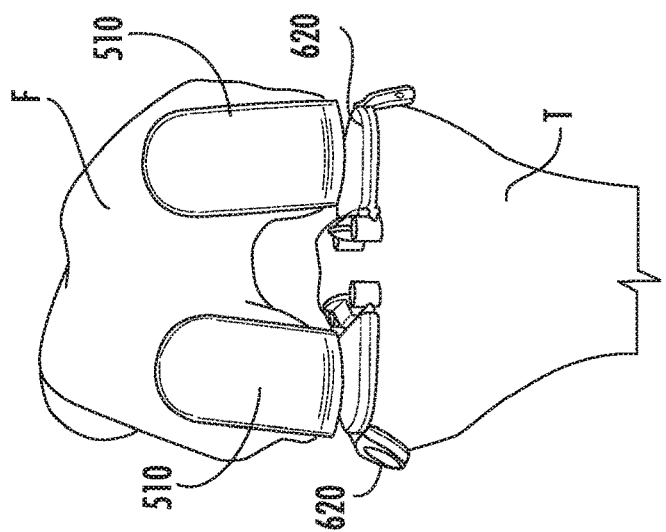
Figure 19C:
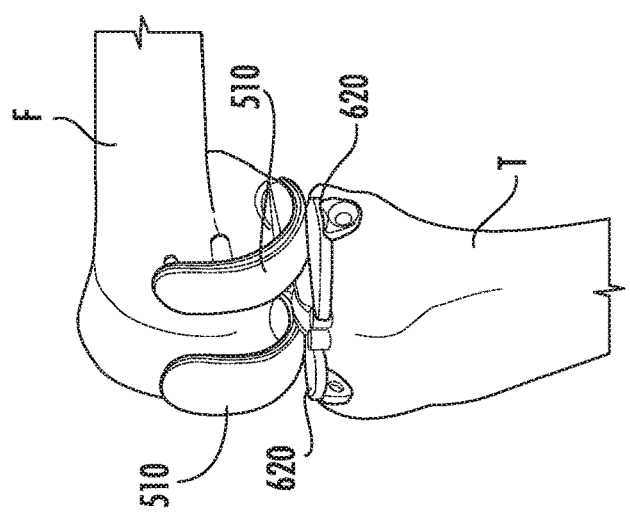

FIGS. 18A-18B illustrate an implant 620 including an anchor 622 and flexible material pad 624 which is similar to the tibia implant 520. The anchor 622 further includes retention tabs 626 which include apertures 628 for receiving bone screws that securely attach the anchor 622 to a bone. An example of these implants 620 being attached to a bone and used in combination with another implant (e.g., femur implants 510) is further illustrated in FIGS. 19A-19C.

Returning to FIGS. 18A-18B, the implant 620 further includes an optional feature of integral cannulae 660. The cannulae 660 are individual tubes which are integrated into the barrier layer 638 of the layered structure of the anchor 622. The barrier layer 638 separates the flexible material pad 624 (and any associated flexible material attachment layer) from a bone attachment layer 636.

The cannulae 660 are features which help to facilitate the surgical implanting of the implant 620, such as by connecting to cables 662 which allow the implant 620 to be expanded from a rolled or condensed state, and/or by serving as connection points for attachment of the retention tabs 626. In this way, enhanced maneuverability of the implant 620 may be possible, allowing the implant 620 to be inserted into a small incision.

Figure 20D:
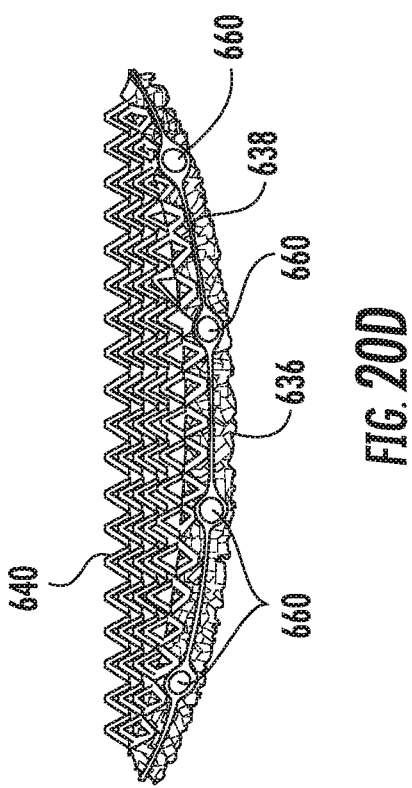
Figure 20C:
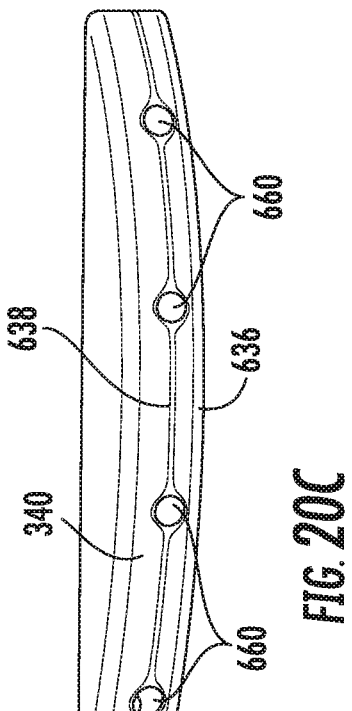
Figure 20E:
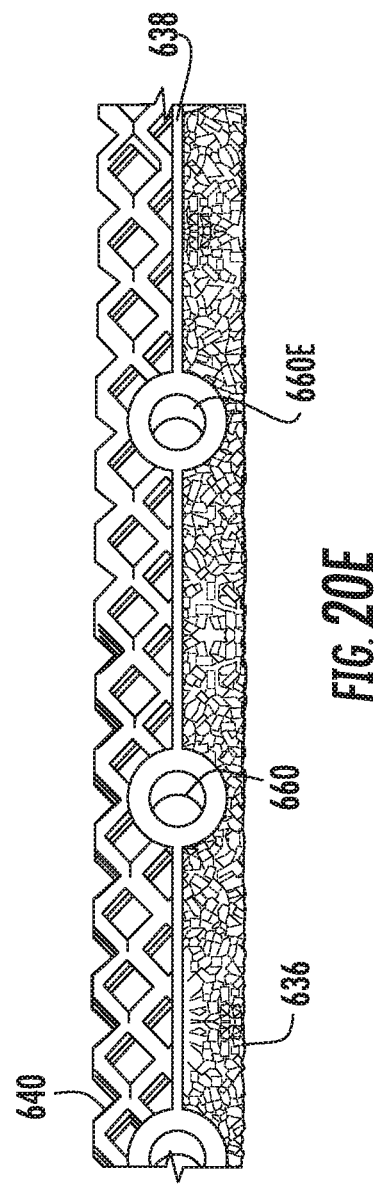

FIGS. 20A-20E further illustrate the implant 620, including the barrier layer 638 including the integral cannulae 660. As shown, the barrier layer 638 is formed to have apertures 662 formed therein, the apertures creating the cannulae 660. As shown in FIGS. 20D-20E, the implant 620 may further include the porous bone attachment layer 636 and flexible material attachment layer 640 sandwiching the barrier layer 638. The barrier layer 638, including the cannulae 660, forms a connection layer which holds the bone attachment layer 636 to the flexible material attachment layer 640 (e.g., during manufacturing processes such as 3-D printing and/or in the final product). This may be accomplished by overlapping the layers such that the porous structures gradually extend into the barrier layer 638 to create an integral attachment.

Porous Structures

As described herein, the disclosed anchors are formed to include multiple layers which serve to create separate porous structures which are configured for fixed attachment to a different material. For example, a bone attachment layer includes relatively small pores which are suitable for receiving bony ingrowth as a bone heals after an operation. A flexible material attachment layer, on the other hand, is configured for attachment to a flexible material which serves as a cartilage replacement layer, and must have pores (e.g., spaces or openings) allowing for such attachment. FIGS. 21, 22A-22C, and 23 provide schematic illustrations that compare the relative pore sizes of the various layers for some of the embodiments disclosed herein. Thus, pores P1 of the illustrated flexible material attachment layer are larger than the pores of other layers, allowing the passage or flow of flexible material. The pores P1 may have a size of approximately about 1.0 mm. Pores P2 of the bone attachment layer are smaller creating for a denser material, but allowing bone ingrowth. The pores P2 may preferably have a size ranging from approximately about 0.29 mm to approximately about 0.65 mm. The size of the pores of any layer may be selected during the 3-D printing process to achieve the goals of the present invention. The pores of the barrier layer may be even smaller, or the barrier layer may essentially be solid with minimal or no pores.

Figure 21:
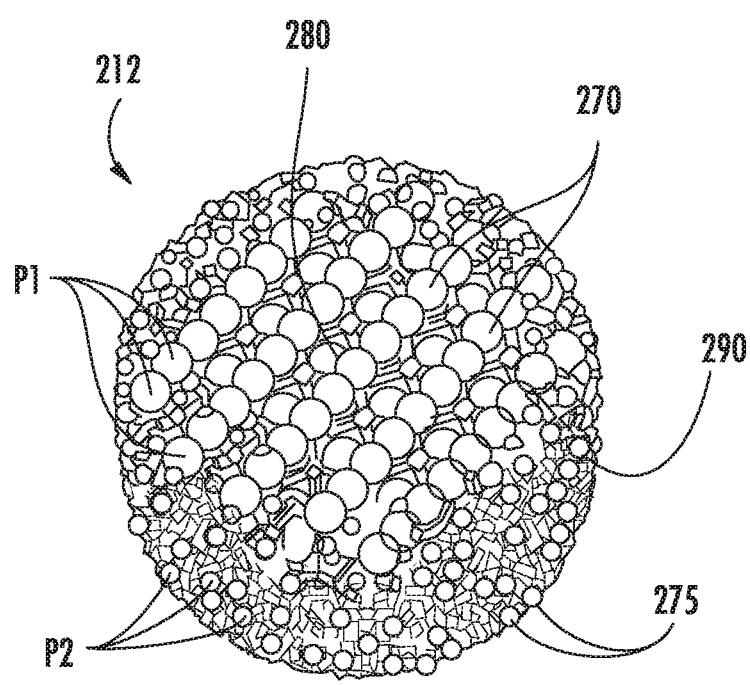
FIG. 21 is a schematic illustration showing relative pore size for a layered cylindrical anchor, consistent with disclosed embodiments.
Figure 22C:
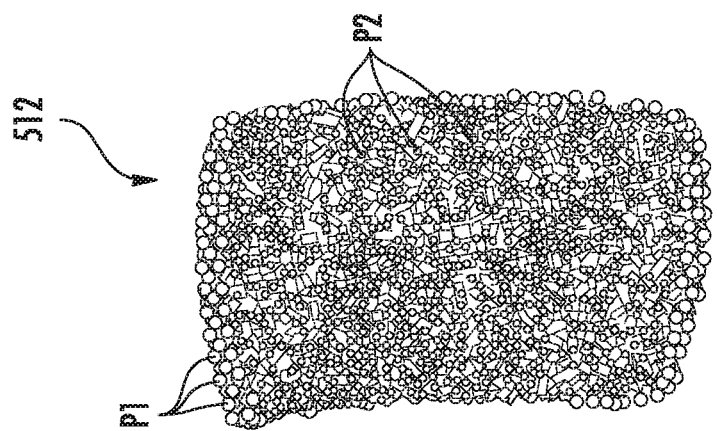
FIGS. 22A-22C are schematic illustrations showing relative pore size for a layered femur implant, consistent with disclosed embodiments.
Figure 22B:
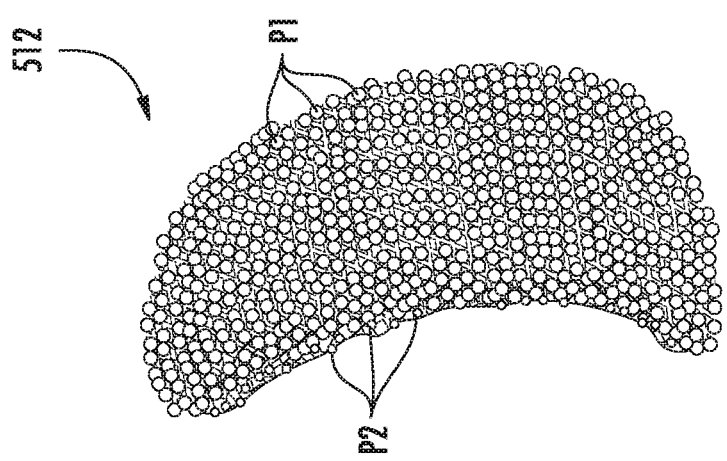
Figure 22A:
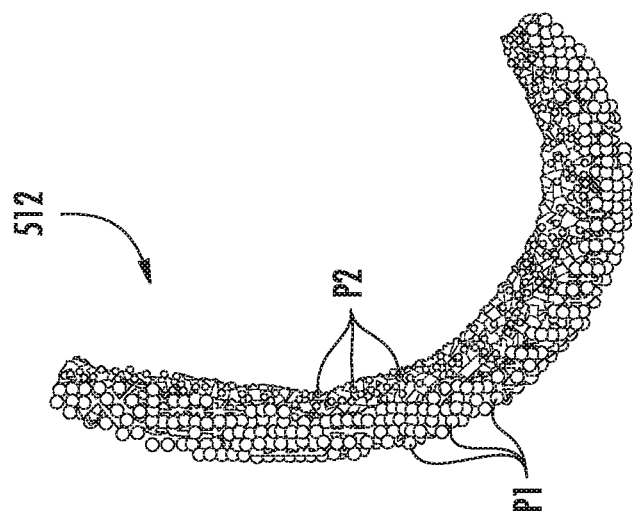
Figure 23:
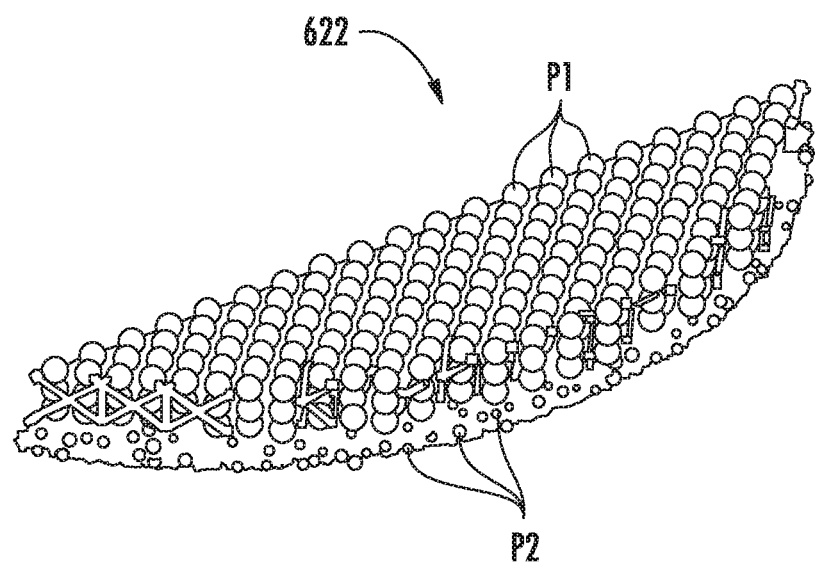
FIG. 23 is a schematic illustration showing relative pore size for a layered tibia implant, consistent with disclosed embodiments.

FIG. 21, for example, illustrates the anchor 212 having larger pore sizes for larger particles 270 in a cavity section 280 than in an outer surface section 290, which includes smaller pores for smaller particles 275. A barrier layer is formed between these sections such that material that can flow through the larger pores in the container section cannot then flow into the smaller pores of the outer surface section. For example, a flexible material cannot flow through the container section 280 into the outer surface section. FIGS. 22A-22C illustrate this concept as applied to the anchor 512 and FIG. 23 illustrates the concept in relation to the anchor 622.

INDUSTRIAL APPLICABILITY

The disclosed implants and associated anchors provide multiple features which may be implemented to produce a system for fixedly attaching a flexible material to a bone. Flexible materials, such as synthetic hydrogels, are very flexible, and can be rolled into cylindrical forms that can be inserted into a joint that is being surgically repaired, via a minimally invasive incision, using an arthroscopic insertion tube. By avoiding and eliminating the need for "open joint" surgery, arthroscopic insertion of a flexible implant in a rolled-up cylindrical form can spare surrounding tissues and blood vessels from more severe damage during an open joint surgical operation. The present embodiments provide an implant system which allows hydrogels or similar flexible materials to be inserted into small incisions and fixedly anchored in place on bone.

Consistent with disclosed embodiments, the disclosed anchors include a hollowed-out structure which forms a space for receiving a portion of the flexible material, creating an attachment base that retains the flexible material and inhibits inadvertent separation. For example, the disclosed anchors include perimeter sidewalls which may be tapered to produce an undercut which inhibits the inadvertent or unintentional removal of the flexible material from the anchor, which in this embodiment is engineered to be replaceable as necessary.

Further, disclosed embodiments, provide features which allow for a large-scale replacement of cartilage without the need for a total joint replacement or joint rebuild. This is achieved through the disclosed features of shaped anchors which match the shape of an associated bone and are further implanted into the bone to fix the flexible material using the disclosed methods.

An implant according to the invention may be formed or otherwise manufactured through an exemplary manufacturing process which includes at least providing an anchor body according to a disclosed embodiment and attaching a flexible material in the cavity of the anchor body, with at least a portion of the flexible material extending out of the top opening of the anchor body.

Figure 24:
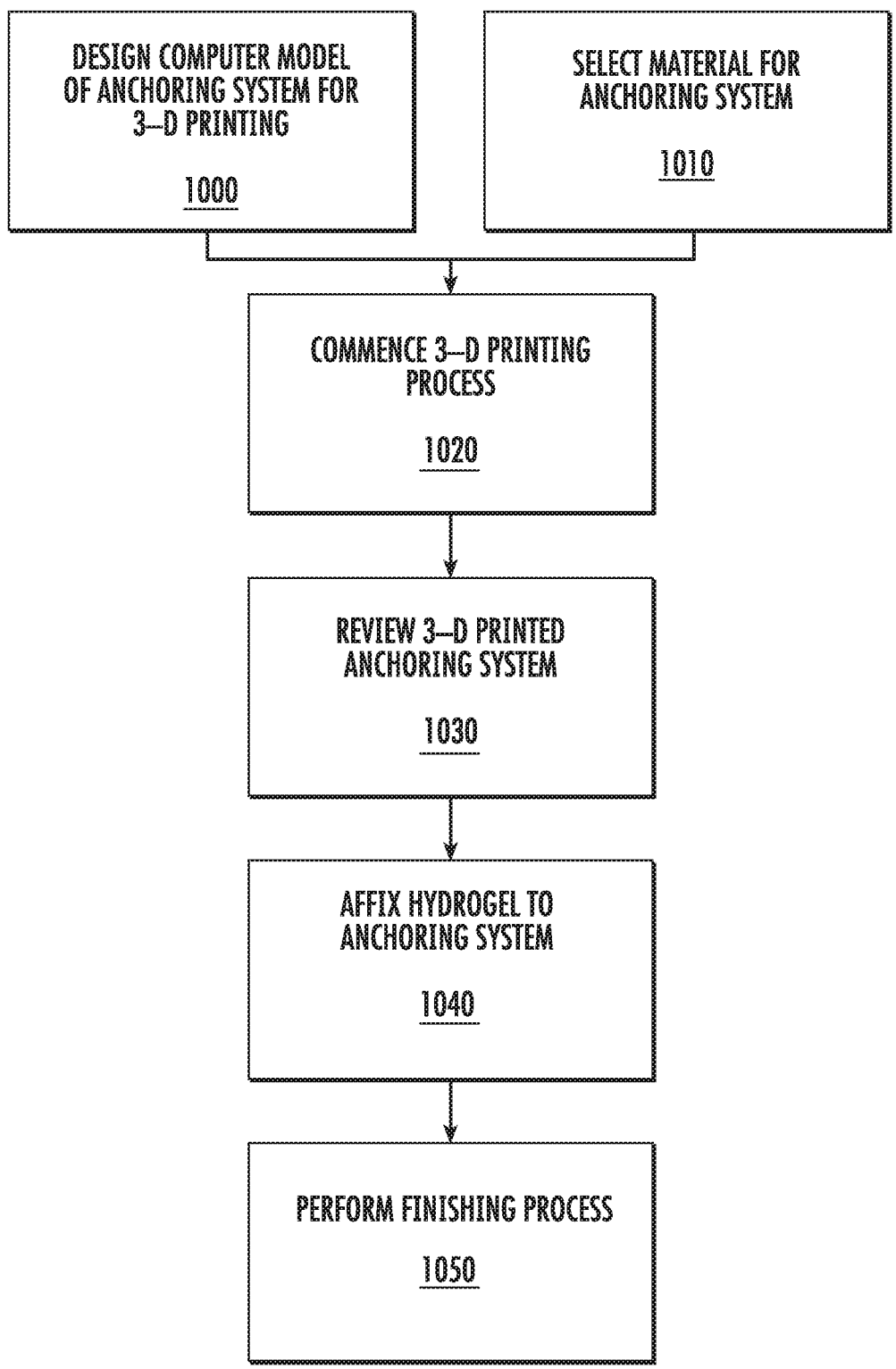
FIG. 24 is a flowchart of an exemplary manufacturing process for a medical implant, consistent with disclosed embodiments.

In at least some embodiments, the anchor body may be provided by the process of 3-D printing, otherwise known as additive manufacturing. This is accomplished through successive layering and/or removal of material. FIG. 24 is a flowchart of an exemplary manufacturing process which may be used to produce an implant consistent with disclosed embodiments.

An anchoring structure for a femur implant such as femur implant 510 described herein will be used as an illustration. As an initial design step [1000], using a computer with 3-D computer-aided design (CAD) software, a 3-dimensional computer model of the anchoring structure of the femur implant 510 is created. During modeling, the size and shape of each layer of the implant may be selected, as well as the porosity and structure of the bone attachment layer 536A, barrier layer 538A, and flexible material attachment layer 540A. The 3-D Cad model may be used to create a .stl 3-D printer file to be utilized by a 3-D printer and process of a selected type. For this example, either a DMLS or EBM process may be used, although other 3-D printing processes may also be used is applicable to creating an implant according to the teachings of the present invention.

In another step [1010], such as in conjunction with the 3-D CAD modeling step, the material to be used, sometimes referred to as a "feedstock," for the anchoring system of the femur implant 510 is selected. In a preferred embodiment, the selected material can be a metal, such as a metal alloy. Alloys of titanium, for example, may be used.

Once the computer files have been processed, the active 3-D printing process commences [1020]. The implant is built by an additive process, layer-by-layer. In other embodiments, material may be removed (e.g., via use of a directed electronic laser).

Once the implant is formed by the 3-D printing process, it is checked for structural integrity and to determine if there are any flaws or finishing processes needed for a finished and acceptable anchoring system [1030].

Upon approval of the implant, a flexible material 514, such as a hydrogel, acting as the cartilage replacement, is affixed in the cavity 517 of the anchoring system [1040], to form the complete femur implant 510. The hydrogel 514 is infused during, for example, a molding process, resulting in secure adhesion of the hydrogel 514 to the anchoring system. The hydrogel is infused and/or molded so that hydrogel 514 is merged into and around the lattice or web-like structure of the flexible material attachment layer 540A. The hydrogel 514 is captured by the flexible material attachment layer 540A, and extends up to the barrier layer 538A.

A finishing process [1050] may be used to check the finished implant and approve it for surgical use.

A method of treating a cartilage disorder in or at a synovial joint is also provided. First, an implant site is prepared for receiving an implant according an embodiment of the invention as described herein. An anchor is provided, preferably using a 3-D printing process as described herein. A flexible material, such as a hydrogel, is molded or otherwise affixed to the anchor with at least a portion in the cavity defined by the anchor. During the procedure, the implant is positioned at, or inserted into, the implant site. The implant may ultimately be affixed to a bone at or adjacent the implant site thought various means, such as press-fitting or mechanical fasteners (e.g., staples, pins, screws etc.). In addition, bone ongrowth and/or ingrowth will assist in attaching the implant to a site. The positioning of the implant places the flexible material in a location in which it can act as cartilage in the synovial joint.

It is appreciated that different aspects or teachings of the various embodiments described herein may be combined in an implant or anchor for a flexible material, and all are considered to be within the scope of the present invention.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. An implant designed and suited for replacing a damaged hyaline cartilage segment in an articulating joint, the implant comprising:
   an anchor body having a bottom wall and an opposite upper edge, the anchor body comprising:
      an upstanding perimeter sidewall comprising an inner barrier layer forming an inner surface of the sidewall and an outer bone attachment layer forming an outer surface of the sidewall,
      a cavity defined by the inner surface of the sidewall and an inner surface of the bottom wall facing the cavity, and
      a top opening into the cavity adjacent the upper edge and bordered by the sidewall,
      the cavity having a height extending between the bottom wall and the upper edge of the anchor body;
   a lattice comprising an array of connected struts extending from the inner surface of the sidewall, the lattice filling a portion of the cavity such that the lattice extends across the cavity between diametrically opposing radial surfaces of the inner surface of the sidewall across an inner width of the cavity, the struts forming a plurality of pores within the cavity, a size of the pores between adjacent struts comprising a porosity different than a porosity of the inner surface of the sidewall and different than a porosity of the outer surface of the sidewall, wherein the lattice does not extend to the upper edge; and
   an elastic hydrogel connected to the anchor body and having a first portion being positioned within the cavity of the anchor body, the hydrogel having a second portion extending out of the top opening and above the upper edge of the anchor body to provide a lubricious articulating surface within the articulating joint, wherein the hydrogel does not contact the outer surface of the sidewall, wherein a portion of the first portion of the hydrogel is received within the array of struts and the lattice is configured to anchor the hydrogel within the cavity, and the implant is configured for replacing the damaged hyaline cartilage segment in the articulating joint.

2. The implant according to claim 1, wherein the inner surface of the sidewall of the anchor body is tapered inwardly toward the top opening of the anchor body.

3. The implant according to claim 2, wherein the cavity of the anchor body includes an upper compartment adjacent the top opening and a lower compartment below the upper compartment, the inner surface of the sidewall of the anchor body being tapered inwardly toward the top opening in the lower compartment and tapered outwardly toward the top opening in the upper compartment.

4. The implant according to claim 1, wherein the outer surface of the sidewall of the anchor body is tapered outwardly toward the upper edge.

5. The implant according to claim 1, wherein the size of the pores between adjacent struts is greater than 0.4 mm.

6. The implant according to claim 5, wherein the lattice covers at least a portion of the inner surface of the sidewall of the anchor body along the height of the cavity and does not extend across the top opening.

7. The implant according to claim 5, wherein the lattice does not extend across the top opening.

8. The implant according to claim 1, wherein the outer bone attachment layer comprises an outer porous layer, the outer porous layer being configured to facilitate attachment to a bone via bony ingrowth, and wherein the outer porous layer includes pores having a pore size of 0.15 mm to 0.5 mm.

9. The implant according to claim 1, wherein the height of the cavity is a first height and the portion of the hydrogel extending above the upper edge of the anchor body has a second height, and wherein the first height is greater than the second height.

10. The implant according to claim 1, wherein the lattice are is in contact with the inner surface of the sidewall.

11. The implant according to claim 1, wherein the hydrogel has a transverse cross-section having a same geometry as a transverse cross-section of the anchor body.

12. The implant according to claim 1, wherein the bottom wall of the anchor body includes an outer bone attachment layer and an inner barrier layer.

13. The implant according to claim 1, wherein the outer bone attachment layer and the inner barrier layer surround the cavity.

14. The implant according to claim 13, wherein at least a portion of the lattice is positioned in contact with the inner barrier layer.

15. The implant according to claim 14, wherein the lattice is radially surrounded by the sidewall.

16. The implant according to claim 1, wherein the second portion of the hydrogel extending out of the top opening of the anchor body contacts the upper edge.

17. The implant according to claim 1, wherein the implant is for arthroscopic replacement of damaged hyaline cartilage of the articulating joint.

18. An implant for replacement of damaged hyaline cartilage of an articulating joint, the implant comprising:
an anchor body having a bottom wall and an upper edge, the anchor body comprising:
an upstanding perimeter sidewall, at least a portion of the sidewall including an outer bone attachment layer and an inner barrier layer,
a cavity defined by the inner barrier layer and the bottom wall, and
a top opening into the cavity;
a lattice comprising an array of connected struts contained within and attached to the inner barrier layer, the struts defining an array of pores between surrounding struts, the pores having a porosity different than a porosity of the inner barrier layer and different than a porosity of the outer bone attachment layer, wherein the lattice does not extend to the upper edge of the anchor body; and
a hydrogel connected to the anchor body and having a first portion positioned in the cavity of the anchor body and surrounded by the sidewall, the hydrogel received within the pores defined by the array of struts, the hydrogel having a second portion extending out of the top opening of the anchor body to define a permanent bearing surface for the damaged hyaline cartilage of the articulating joint;
wherein the hydrogel does not contact an outer surface of the sidewall,
wherein at least a portion of the array of struts is surrounded by a portion of the hydrogel received within the container such that the hydrogel permeates into and through the array of struts to thereby couple the hydrogel to the anchor body, and
wherein the array of struts is arranged to extend along a height of the inner barrier layer so as to firmly engage and hold the hydrogel within the container.

19. The implant according to claim 18, wherein the lattice is connected to and extends from the inner barrier layer, and the inner barrier layer provides a barrier between the hydrogel and the outer bone attachment layer.

20. The implant according to claim 18, wherein the inner barrier layer is impermeable to the hydrogel.

21. The implant according to claim 18, wherein the inner barrier layer, the lattice, and the outer bone attachment layer are integrally formed with each other.

22. The implant according to claim 18, wherein the inner barrier layer is positioned directly between the lattice and the outer bone attachment layer.

23. The implant according to claim 18, wherein at least a bottom portion of the sidewall includes the outer bone attachment layer and the inner barrier layer.

24. An implant for replacement of damaged hyaline cartilage of an articulating joint, the implant comprising:
an anchor body formed as a container having an upstanding perimeter sidewall for holding a hydrogel, the anchor body comprising:
an outer bone attachment layer forming an outer surface of the sidewall comprising a trabecular porous surface configured to provide for a permanent healing fixation of the anchor body to surrounding subchondral bone,
an inner barrier layer forming an inner surface of the sidewall, and
an internal array of connected struts contained within and attached to the inner barrier layer, wherein spaces are formed between adjacent struts, and
wherein the struts do not extend to an upper edge of the container; and
a hydrogel partially received within the container, the hydrogel having an exposed protruding portion extending out of a top opening of the anchor body and configured to define a permanent bearing surface for the damaged hyaline cartilage of the articulating joint;

wherein the hydrogel is positioned so as to not extend along the outer surface of the sidewall, wherein at least a portion of the array of struts is surrounded by a portion of the hydrogel received within the container such that the hydrogel permeates into and through the array of struts to thereby couple the hydrogel to the anchor body, wherein the inner barrier layer has a porosity less than a porosity of the outer bone attachment layer and less than the spaces between adjacent struts of the array of struts, and the inner barrier layer is thereby configured to prevent a flow of hydrogel from the container into the trabecular porous surface when the hydrogel is molded into and attached to the array of struts, and wherein the array of struts is arranged to extend along a height of the inner barrier layer so as to firmly engage and hold the hydrogel within the container.

* * * * *